US011024090B2

(12) United States Patent
Cragg et al.

(10) Patent No.: US 11,024,090 B2
(45) Date of Patent: Jun. 1, 2021

(54) VIRTUAL FRAME FOR GUIDED IMAGE COMPOSITION

(71) Applicant: Adobe Inc., San Jose, CA (US)

(72) Inventors: Michael Cragg, Troy, MI (US); Yue Shen, Pleasanton, CA (US); Chintan Intwala, Redwood City, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/456,489

(22) Filed: Jun. 28, 2019

(65) Prior Publication Data

US 2020/0410761 A1     Dec. 31, 2020

(51) Int. Cl.
*G06T 19/00* (2011.01)
*G06F 3/0481* (2013.01)
*G06F 3/01* (2006.01)
*G06F 3/16* (2006.01)

(52) U.S. Cl.
CPC ............ *G06T 19/006* (2013.01); *G06F 3/016* (2013.01); *G06F 3/0481* (2013.01); *G06F 3/167* (2013.01); *G06T 2200/04* (2013.01); *G06T 2200/24* (2013.01)

(58) Field of Classification Search
CPC ........ H04N 5/222; H04N 5/225; G06F 3/016; G06F 3/0481; G06F 3/167; G06T 7/70; G06T 19/006; G06T 2200/04; G06T 2200/24
USPC ....................................................... 345/633
See application file for complete search history.

(56) References Cited

U.S. PATENT DOCUMENTS

2018/0295281 A1\* 10/2018 Hao .......................... G06T 7/70
2019/0306411 A1\* 10/2019 Lusk .................. H04N 5/23222

OTHER PUBLICATIONS

"Flotogram—Augmented Reality Video Time Kaleidoscope Luckybulldozer", https://www.flotogram.com/, 6 pages.
Apple Developer, "Augmented Reality", https://developer.apple.com/arkit/, 5 pages.
Ruffenach, Collin, "Announcing Photo Check Deposit", Nov. 28, 2012, https://www.simple.com/company/announcing-photo-check-deposit.
"Frismo—Composition camera", https://apps.apple.com/in/app/frismo-composition-camera/id1320468242, 2 pages.

(Continued)

*Primary Examiner* — Jacinta M Crawford
(74) *Attorney, Agent, or Firm* — Kilpatrick Townsend & Stockton LLP

(57) ABSTRACT

Techniques are disclosed for providing guidance information for guiding a user to capture an image according to a predefined composition. A first user may provide information identifying a reference frame that defines a composition desired by the first user. The reference frame depicts a particular view of the real-world environment that the first user desires as the composition of the photo-to-be-taken by a second user. Based upon the reference frame and using augmented reality techniques, AR content is presented to a second user that guides the second user in positioning and orienting the image capture device such that the live view captured by the image capture device matches the particular view. When the live view aligns with the particular view, the second user may take a photo. The composition of such a photo matches the composition desired by the first user and represented by the reference frame.

19 Claims, 10 Drawing Sheets

(56) References Cited

OTHER PUBLICATIONS

"SOVS—Composition Camera", https://apps.apple.com/ph/app/sovs-composition-camera/id1326747827, 3 pages.
"Blocker" http://blocker.afternow.io/, 4 pages.

* cited by examiner

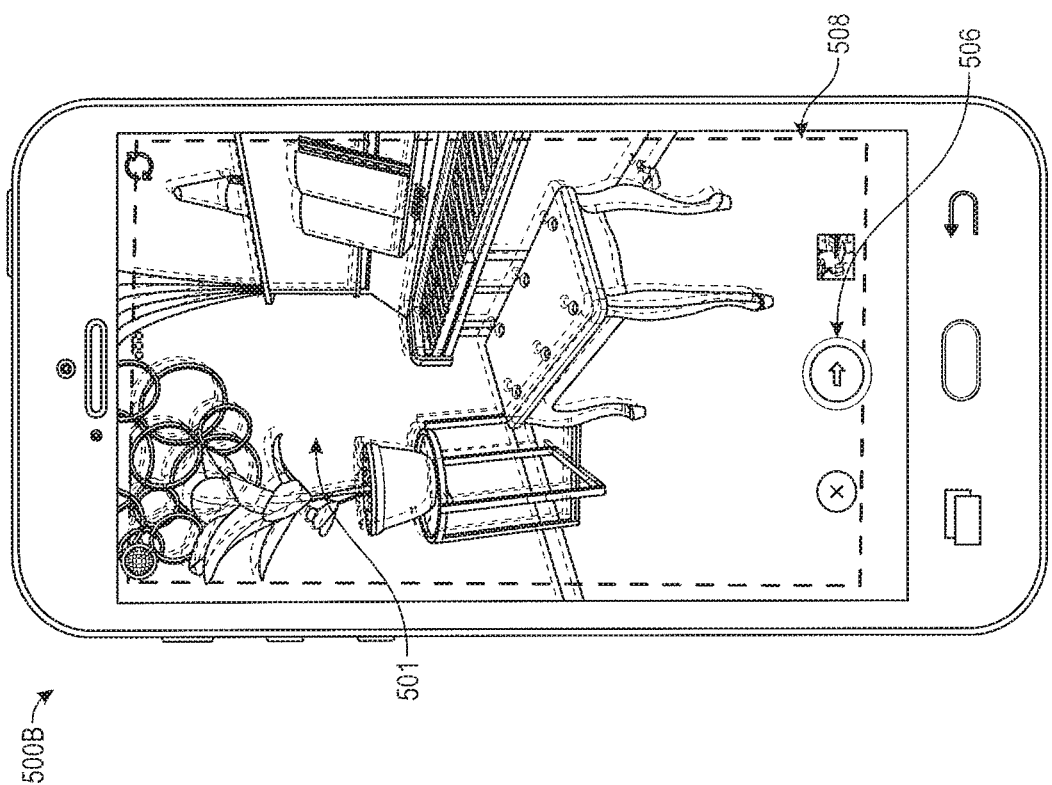
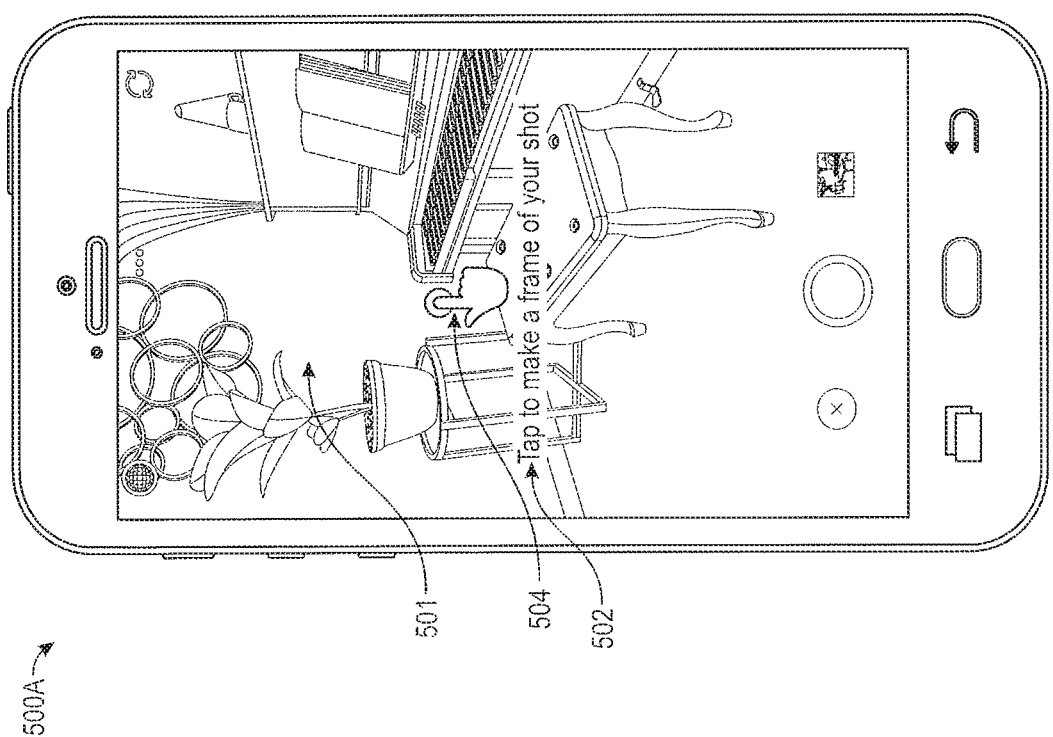
FIG. 5A
FIG. 5B

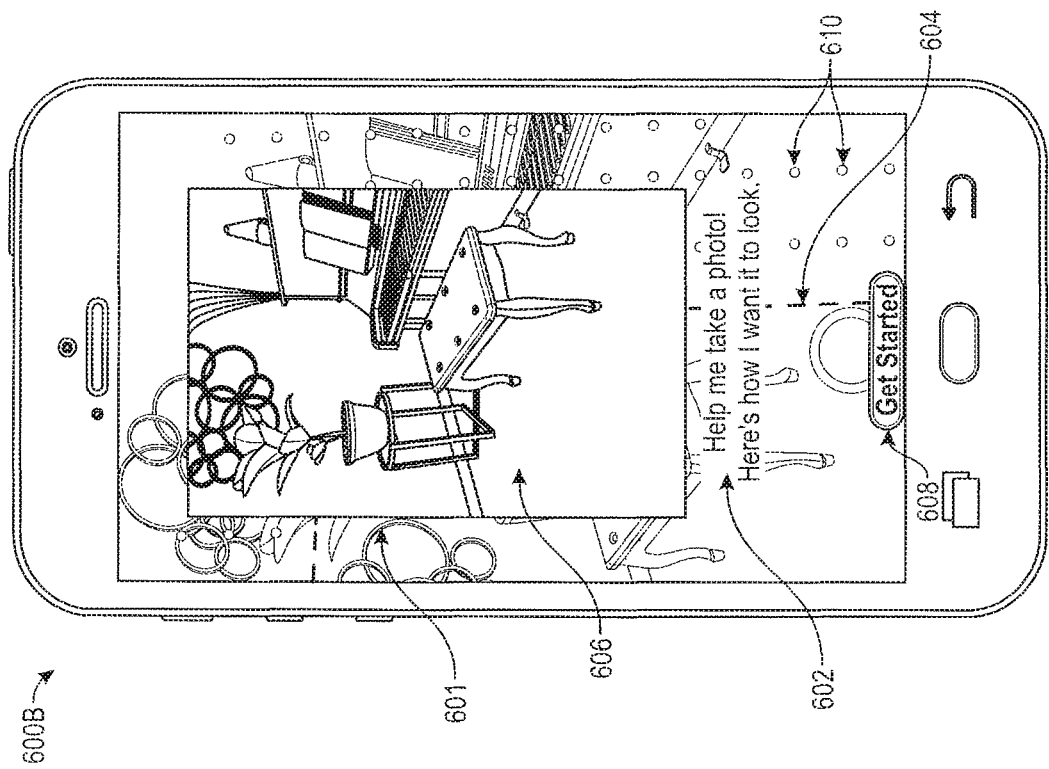
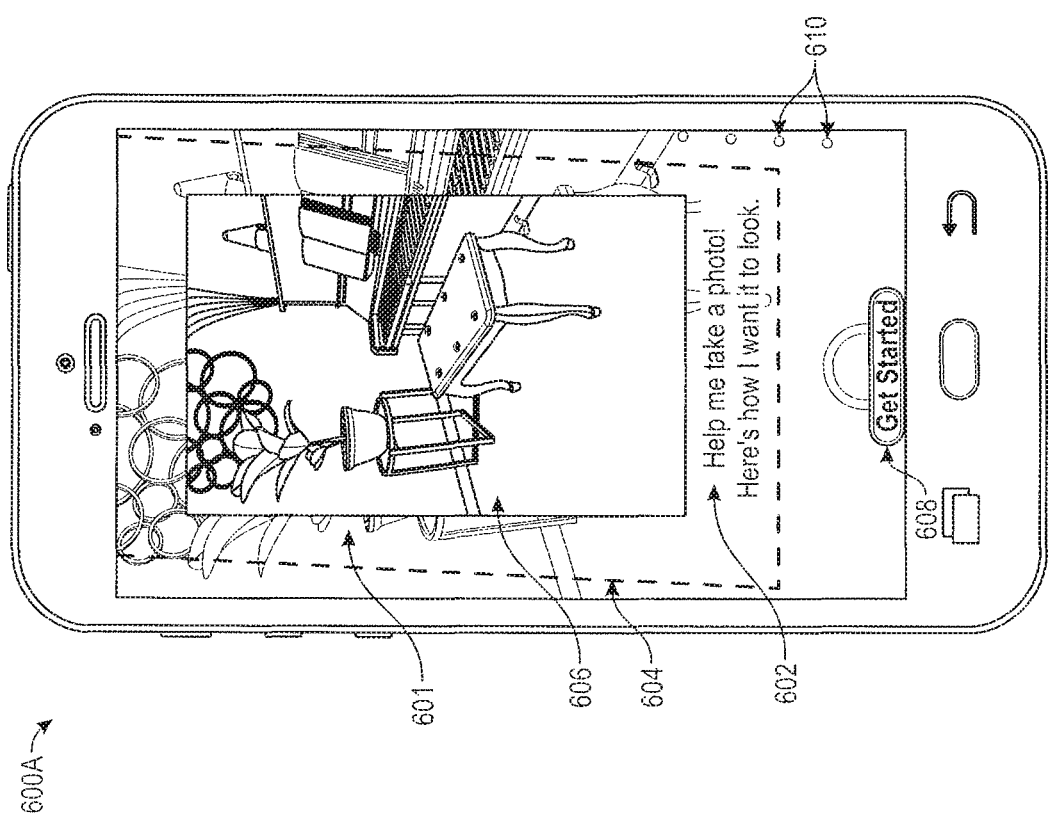
FIG. 6A
FIG. 6B

VIRTUAL FRAME FOR GUIDED IMAGE COMPOSITION

TECHNICAL FIELD

This disclosure generally relates to guided image capture. More specifically, but not by way of limitation, this disclosure describes techniques for using augmented reality (AR) for guiding a user to capture an image based on a predefined composition.

BACKGROUND

Digital photography is increasingly popular, as the amount of devices capable of capturing an image increases. Image capture devices, such as camera-enabled mobile devices, digital cameras, and tablets, are popularly used to take photos on the go. An image capture device generally includes a display or screen which can act as a viewfinder. While viewing the image shown on the display, a user can change the position and orientation of the image capture device to take a photo with a desired composition. The user can also select photo settings such as filters, exposure, and the like, on the image capture device to be applied for taking the photo. An image capture device may be used in conjunction with various applications for customizing and/or editing a photo taken using the image capture device.

When a first person asks a second person to take a photo, such as a photo of the first person in front of a landmark, the resulting photos often do not meet the first person's expectations. This is because the first person relinquishes control over the look and feel of the photo to be captured to the second person, who may not frame or compose the photo as desired by the first person. It is very difficult for the first person to convey the desired composition, settings, and the like, to the second person, resulting in discrepancies between the photo desired and the photo obtained. For example, the first person may want a full-body shot while the second person only captures the first person's head. As another example, the image captured may cut off an interesting background element. Especially when traveling in a foreign country (e.g., where a different language is spoken), it can be difficult to explain to a stranger how one wants a photo to be composed.

SUMMARY

The present disclosure describes techniques for providing guidance information for guiding a user to capture an image according to a predefined composition. In certain embodiments, the guidance information may be provided to the user using augmented reality (AR) techniques. In some other embodiments, other techniques such as using non-visual information (e.g., audio information, haptic information), may be used for outputting the guidance information.

In certain embodiments, augmented reality (AR) techniques are used for guiding the capture of an image that matches a predefined composition. The guided image capture techniques described herein enables a first user to provide information identifying a reference frame that defines a composition desired by the first user. The reference frame depicts a particular view of the real-world environment that the first user desires as the composition of the photo-to-be-taken by a second user. After the first user hands-off the image capture device to a second user for capturing a photo or image, based upon the reference frame and using augmented reality techniques, AR content is presented to the second user where the AR content includes virtual guidance information that guides the second user to change the position and orientation of the image capture device such that the live view of the real-world environment captured by the image capture device matches the particular view of the reference frame. Once the image capture device is positioned and oriented such that live view captured by the image capture device matches the particular view, the second user may take a photo. The composition of such a photo matches the composition desired by the first user and represented by the reference frame.

A photo guide system is disclosed that uses AR techniques for guiding image capture based on a predefined composition. For example, a photo guide system executing on an image capture device receives information from a first user identifying a reference frame defining a composition desired by the first user. The reference frame depicts a particular view of the real-world environment. The photo guide system generates a virtual frame corresponding to the reference frame. The photo guide system may receive a stream of live images captured using the image capture device. Each live image in the stream depicts a corresponding view of the real-world environment based upon a position and orientation of the image capture device at a time of capturing the live image. The photo guide system generates an augmented reality (AR) image by augmenting a first live image from the stream of live images with first virtual guidance information, where the first virtual guidance information comprises the virtual frame and first virtual direction information. The AR image is generated by overlaying the virtual frame on the first live image at a position determined based upon the particular view and a view of the real-world environment depicted in the first live image. Additionally, in the AR image, the first guidance information is overlaid on the first live image. The first guidance information comprises information for changing a position and orientation of the image capture device from a position and orientation at a time of capturing the first live image to a position and orientation of the image capture device that depicts the particular view. The first AR image is then output via the image capture device. The AR display is updated, including updating the position of the virtual frame and the virtual direction information, as the position and orientation of the image capture device changes. In some embodiments, the virtual guidance information is used by a second user to capture an image, such that the composition of the captured image matches the composition defined by the reference frame.

These illustrative embodiments are mentioned not to limit or define the disclosure, but to provide examples to aid understanding thereof. The foregoing, together with other features and embodiments will become more apparent upon referring to the following specification, claims, and accompanying drawings.

BRIEF DESCRIPTION OF THE DRAWINGS

Features, embodiments, and advantages of the present disclosure are better understood when the following Detailed Description is read with reference to the accompanying drawings.

FIGS. 5A-5B depict examples of user interfaces for establishing image guiding parameters, according to certain embodiments of the present disclosure.

FIG. 6A-6F depict examples of user interface elements for guided image capture, according to certain embodiments of the present disclosure.

DETAILED DESCRIPTION

Figure 1:
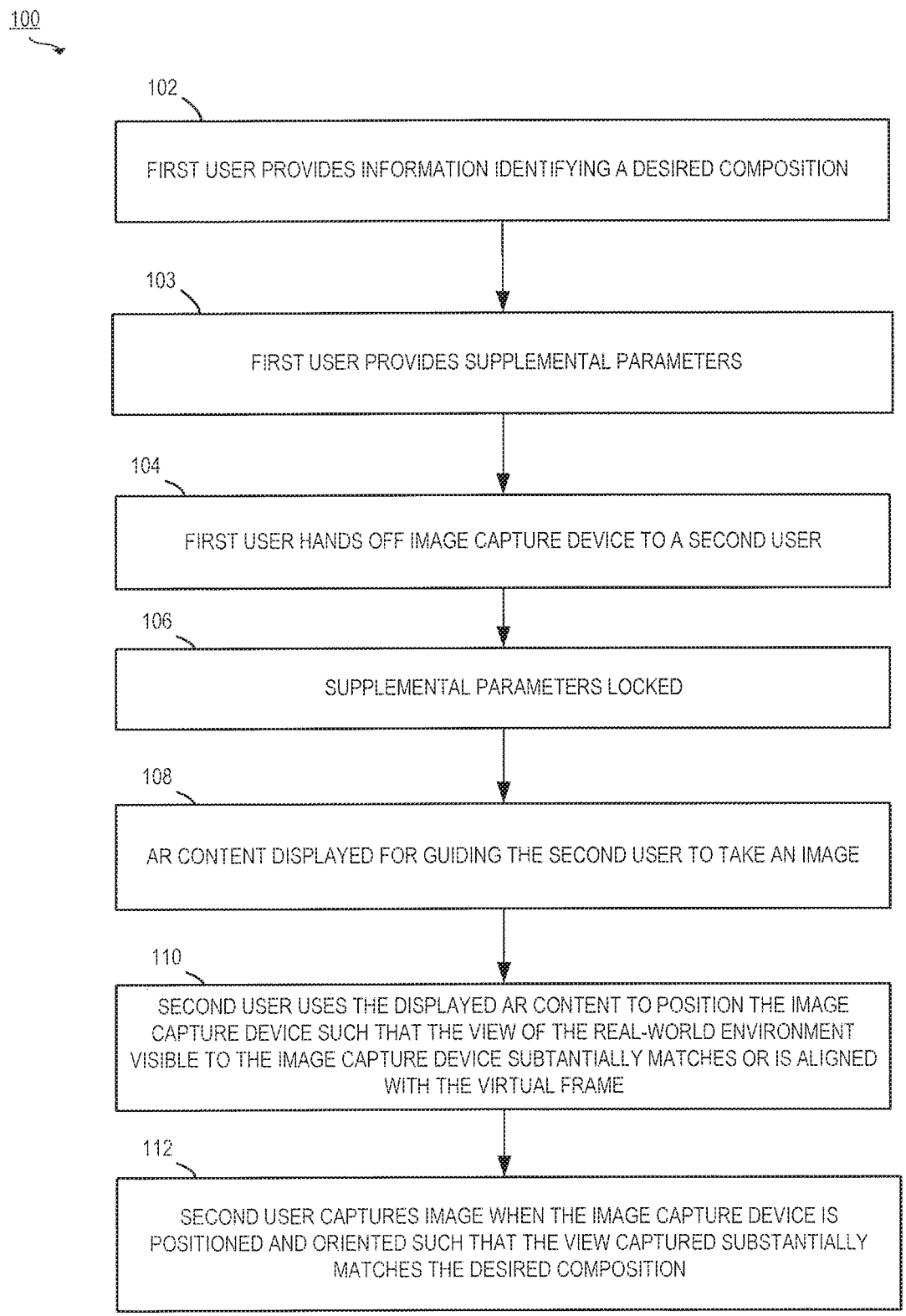
FIG. 1 depicts an example of a method for guiding a user to capture a photo based on parameters provided by another user, according to certain embodiments of the present disclosure.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "an example" is not necessarily to be construed as preferred or advantageous over other embodiments or designs. Various embodiments are described herein, including methods, systems, non-transitory computer-readable storage media storing programs, code, or instructions executable by one or more processors, and the like.

The present disclosure describes techniques for providing guidance information for guiding a user to capture an image according to a predefined composition. In certain embodiments, the guidance information may be provided to the user using augmented reality (AR) techniques. In some other embodiments, other techniques such as using non-visual information (e.g., audio information, haptic information), may be used for outputting the guidance information.

The present disclosure describes a photo guide system that uses augmented reality (AR) for guiding the capture of an image that matches a predefined composition. The photo guide system enables a first user to provide information identifying a reference frame that defines a composition desired by the first user. The reference frame depicts a particular view of the real-world environment that the first user desires as the composition of the photo-to-be-taken by a second user. After the first user requests a second user to take a photo, augmented reality techniques are used for displaying AR content to the second user, where the AR content comprises virtual guidance information that provides guidance to the second user to change the position and orientation of the image capture device such that the live view of the real-world environment captured by the image capture device matches the particular view of the reference frame. Once the second user has positioned and oriented the image capture device such that live view captured by the image capture device matches the particular view, the second user may take a photo. The composition of such a photo matches the composition desired by the first user and represented by the reference frame.

The photo guide system described herein provides a simple and elegant solution to problems described in the Background section when a first user asks a second user to take a photo. The photo guide system enables the first user to provide a desired composition, which may provide the exact angle, perspective, content positioning, etc. desired by the first user. The photo guide system then enables the second user to capture a photo or image that has a composition that is similar to the desired composition. The resulting photos captured by the second user using the photo guide system are more likely to meet the first user's expectations with respect to composition. Due to the capabilities of the photo guide system, the first user does not have to verbally communicate with the second user regarding the composition to be captured, thus eliminating any language-based boundaries.

The first user may also set other image capture-related parameters such as flash settings, International Standard Organization (ISO) settings, exposure settings, aperture settings, shutter speed settings, white balance settings, focus settings, camera mode settings, filter settings, etc. These settings are then used and applied when the second user takes the photo. Accordingly, in addition to the composition, the first user can also set other desired attributes of the photo to be taken. The photo guide system seamlessly uses and applies these parameters when the photo is taken by the second user.

The following non-limiting example is provided to introduce certain embodiments. A first user, Tom, is visiting the Grand Canyon and wants a picture of himself in front of the landmark. Tom decides to ask a stranger, Mary to take a photo using Tom's mobile phone. Tom opens up an AR photo guide application on his mobile phone to guide Mary to take the photo according to Tom's specifications. The AR photo guide application displays a prompt for Tom to define a composition. Tom carefully aligns the mobile phone so that a field of view of the real-world environment captured by the mobile phone includes what Tom considers an optimal composition—the Grand Canyon diagonally across the field of view, with the sky covering about ⅓ of the image, and a perfect spot in the foreground in which Tom will stand. Tom interacts with the mobile phone to establish the composition for the image to-be-captured. For example, Tom may click a button on the mobile phone or a user-selectable option (e.g., a button) presented by the photo guide application to indicate the optimal desired composition. Responsive to Tom's interactions, the photo guide system identifies a reference frame defining the desired composition, which corresponds to a particular field of view of the real world visible to the mobile phone. Tom may optionally further select camera settings such as exposure settings, ISO settings, etc. for taking the "perfect" photo. Tom interacts with his mobile phone (e.g., via a user-selectable option displayed by the photo guide application, via a mobile phone button) to indicate to the AR photo guide application that he is now handing off the mobile phone to stranger Mary. The selected camera settings are locked upon the handoff, so that the photo-taker Mary cannot inadvertently change the settings.

Tom hands off his mobile phone to Mary. With the intention of taking Tom's photo, Mary points the phone towards where Tom is standing, but the phone is not aligned to achieve the desired composition. The AR photo guide application displays to Mary AR content in a viewfinder of Tom's mobile phone (e.g., screen of the mobile phone), which is updated as Mary moves the mobile phone. The AR content comprises virtual guidance information superimposed on a live image of the real-world environment captured by Tom's phone. The virtual guidance information includes a virtual frame corresponding to the reference frame. In the AR content, the virtual frame is positioned over a live image in a position and orientation that are determined based upon the particular view of the real-world environment represented by the reference frame and the view of the real-world environment corresponding to the live image. The virtual guidance information displayed by the AR photo guide application in the AR content also includes virtual direction information that provides guidance to Mary as to how to change the position and orientation of Tom's phone such that the live view of the real-world environment captured by Tom's phone approaches and matches the particular view corresponding to the reference frame, which is represented by the virtual frame in the AR content. The virtual direction information is in the form of a series of dots radiating towards the virtual frame and the text, "Help me take a photo!" The AR photo guide application darkens or shadows the portion of the field of view of the mobile phone which does not align with the virtual frame and the virtual frame is accentuated to draw Mary's eye to the virtual frame within the AR content. Mary is thereby provided information on how to move Tom's mobile phone closer and closer to a point of alignment with the virtual frame (i.e., the view captured by Tom's phone aligns with the virtual frame). By following the dots radiating towards the virtual frame, Mary guides the mobile phone (e.g., changes the position and/or orientation of Tom's phone) so that the field of view of the real-world environment visible to Tom's phone is very closely aligned with the virtual frame. When the field of view matches virtual frame (i.e., matches the composition defined by the reference frame), the AR photo guide application activates a shutter button and displays the text "Take the photo now!" Mary interacts with the shutter button and takes a photo, which has the composition and other qualities that match those specified by Tom.

In the Tom and Mary example above, Tom's mobile phone is used to take the final photo. This is not intended to be limiting. In some scenarios, if Mary had a mobile phone or camera executing the AR photo guide application, Mary's phone could have been substituted for Tom's phone in the above example and used for taking the photo.

Augmented Reality ("AR") refers to technology that superimposes virtual guidance information (e.g., computer-generated information) on a view of the real word environment. The view of the real-world environment may be a view as viewed by the optics of a device such as by a camera of a smartphone. AR techniques are used to generate AR content that presents a composite view in which virtual guidance information is superimposed or overlaid on a view of the real word environment. In AR content, virtual objects are placed into a view of the physical real-world environment. AR content may thus include an image or video of the real-world environment with virtual guidance information such as virtual objects superimposed over the image or video feed. For example, the photo guide system superimposes a virtual frame corresponding to the reference frame and virtual direction information over a live image or video captured by a camera or image capture device.

The terms "field of view" or "angle of view" or "view" for an image capture device refer to a portion of the observable real-world environment which is visible to the image capture device (e.g., to a camera). The field of view for an image capture device is dependent upon a given particular position and orientation of the image capture device in 3-dimensional (3-D) space in the real-world environment. When an image is captured using an image capture device (e.g., by clicking the shutter release button on the image capture device), the field of view of the image capture device represents the portion of the real-world environment that is captured in that image. Objects in the observable real-world environment which are outside the field of view of the image capture device when an image is captured are not recorded in the image.

An image capture device typically has six degrees of freedom in 3-D space: (1) translation movement along an X-axis; (2) translation movement along a Y-axis; (3) translation movement along a Z-axis; (4) rotation about the X-axis (roll); (5) rotation about the Y-axis (pitch); and rotation about the Z-axis (yaw). The position of an object (e.g., of the image capture device, of a virtual object in an AR frame) is represented by (x, y, z) coordinates that represent the position of the object along the X, Y, and Z axes, respectively. The orientation of the object is represented by the roll, pitch, and yaw.

Referring now to the drawings, FIG. 1 depicts an example of a high-level method 100 for guided image capture, according to certain embodiments. Although FIG. 1 depicts the various method steps occurring in a particular sequence or order, this is not intended to be limiting. In certain alternative embodiments, the steps may be performed in some different order or some steps may also be performed in parallel.

In the example depicted in FIG. 1, a photo guide system assists a first user in establishing a specific composition and, optionally, specific image parameters so that a second user may be guided to take an image according to the specific composition and specified image parameters. In certain embodiments, the photo guide system may execute on the image capture device that is used to capture the image or photo. In some other embodiments, the photo guide system may be executed by a computer system that is separate from the image capture device and which, in cooperation with the image capture device, enables the method depicted in FIG. 1 and described below to be performed.

At 102, a first user provides information identifying a desired composition. The desired composition may be provided in the form of a reference frame that depicts a particular view of the real-world environment, where the particular view represents the first user's desired composition. In certain embodiments, the image capture device may be used by the first user to define the reference frame. For example, the first user may change the position and orientation of the image capture device until the field of view of the real-world environment visible to the image capture device represents the first user's desired composition. For example, the first user may change the position and orientation the first user's smartphone until the viewfinder (e.g., the screen) of the phone displays real-world environment elements and arrangements of those elements (e.g., angles, perspective, etc.) in an arrangement that the first user wishes to capture in an image-to-be-taken. As part of defining the reference frame, the first user may also consider what real-world environment elements are to be included in the image-to-be-taken, where the first user wants to position himself/herself with respect to the elements, and the like. Once a particular field of view of the image capture device represents the composition desired by the first user, the first user may provide input to the photo guide system indicating that the particular view is to be used as the reference frame.

At 103, the first user may optionally provide or set on the image capture device supplemental imaging parameters related to the image-to-be-captured. Examples of supplemental parameters include parameters related to flash settings, International Standard Organization (ISO) settings, exposure settings, aperture settings, shutter speed settings, white balance settings, focus settings, camera mode settings, filter settings, aspect ratio settings, settings related to a number of images to be captured (e.g., one, or multiple images), etc.

At 104, the first user hands off the image capture device to a second user for the second user to use the image capture device to capture an image using the image capture device. As part of 104, the first user may interact with and provide input to the photo guide system indicating that the first user is about to hand off the image capture device to the second user. For example, the photo guide system may cause a button to be displayed by the image capture device that the first user can select to indicate to the photo guide system that the user is about to handoff the image capture device to the second user. In some embodiments, the image capture device may itself automatically, and without receiving any specific first user input, determine that a handoff is occurring based upon, for example, a distinctive pattern of motion sensed by a gyroscope (or other motion sensing sensors) of the image capture device. The handoff causes the position and orientation of the image capture device to be changed from when the reference frame was provided by the first user.

In response to the handoff indication, at 106, the photo guide system locks the supplemental parameters such that they cannot be inadvertently be changed or modified by the second user when capturing the image(s). Locking the supplemental parameters ensures that the settings selected by the first user will be used by the second user to capture the image.

At 108, the photo guide system generates and displays AR content for guiding the second user to take an image that matches the desired composition represented by the reference frame received in 102. The AR content is output via a screen or display of the image capture device such that the second user can see the AR content while capturing the image. The AR content comprises virtual guidance information that is superimposed or overlaid on an live image captured by the image capture device. The virtual guidance information in the AR content provides guidance to the second user to change the position and orientation of the image capture device such that the live view of the real-world environment captured by the image capture device matches the particular view of the reference frame.

In certain embodiments, virtual guidance information displayed in the AR content includes a virtual object or virtual frame corresponding to the reference frame and virtual direction information. In the AR content, the virtual frame is positioned over a live image in a position and orientation that are determined based upon the particular view of the real-world environment represented by the reference frame and the view of the real-world environment corresponding to the live image. The virtual frame typically has a closed shape.

The virtual direction information in the AR content includes information that provides guidance to the second user as to how to change the position and orientation of the image capture device such that the live view of the real-world environment captured by the image capture device aligns with the virtual frame, i.e., matches the particular view corresponding to the reference frame, which is represented by the virtual frame in the AR content. The virtual direction information may be displayed in various forms. In some embodiments, the virtual direction information is displayed as dots radiating around the virtual frame to guide the second user to move the image capture device toward a point of alignment with the virtual frame. As another example, the virtual direction information may comprise arrows pointing toward the virtual frame. Examples of virtual frames and virtual direction information are shown in FIGS. 6C-6F and described below.

The virtual frame may not always be visible in the field of view displayed by the image capture device. This may happen, for example, when the second user is pointing the image capture device in a direction such that the area or view of the real-world environment represented by the reference frame is not within the field of view of the real-world environment visible to the image capture device. In some embodiments, if the virtual frame and field of view of the image capture device are perfectly aligned, then the virtual frame may not be displayed in the AR content.

In other embodiments, instead of using visual information (or in addition to the visual information) for representing the virtual guidance information in the AR content, the guidance information may be output using non-visual mechanisms. As an example, the photo guide system may provide voice guiding information (e.g., move left, move right, move up) to the second user. As another example, the photo guide system may provide guidance using haptic feedback to guide the second user (e.g., shaking grows stronger as the field of view of the image capture device moves closer to or farther from the desired position corresponding to the reference frame).

In some embodiments, the photo guide system continuously updates and displays the AR content based upon the changing position and orientation of the image capture device. The photo guide system receives a live stream of images (e.g., a video stream) corresponding to the position and orientation of the image capture device. Each image in the live stream represents a particular view of the real-world environment from the image capture device's perspective. The photo guide system uses this stream of live images to generate AR content, where the AR content comprises a stream of AR images generated based upon the live images. The photo guide system generates an augmented reality (AR) image by augmenting a live image from the stream of live images with virtual guidance information, comprising the virtual frame and virtual direction information. The AR image is generated by overlaying the virtual frame on the live image at a position determined based upon the particular view corresponding to the virtual frame and a view of the real-world environment depicted in the live image. Additionally, in the AR image, the guidance information is overlaid on the live image. The AR content is updated (e.g., in real time), including updating the position of the virtual frame and the virtual direction information, as the position and orientation of the image capture device changes.

At 110, the second user uses the displayed AR content (or using non-visual guidance content) to change the position and/or orientation of the image capture device such that the image capture device is positioned in a particular position and orientation where the view of the real-world environment visible to the image capture device matches or is aligned with the virtual frame. When this happens, it means that the view visible to the image capture device matches the particular view of the real-world environment represented by the reference frame.

As an example, the second user moves the image capture device by following dots radiating from the virtual frame until the field of view of the image capture device is almost overlapping with the virtual frame. An example of such a position is shown in FIG. 6F—the virtual frame is barely visible. In some embodiments, the photo guide system modifies the displayed guide information when a match is attained. As an example, an image within the virtual frame is initially displayed with high opacity and becomes increasingly translucent as the image capture device is moved toward alignment. As another example, the photo guide system transmits a notification to the second user when a match is attained (e.g., green light, text, such as "Success!", or speech cues such as "Perfect!").

At 112, the second user captures an image when the image capture device is positioned and oriented such that the view of the real-world environment visible to the image capture device matches virtual frame, which represents the desired composition provided by the first user in 102. The second user may capture the image by interacting with the image capture device (e.g., clicking a button on the image capture device) and/or by interacting with an interface element (e.g., a digital button) for capturing the image displayed by the photo guide system. The image may be captured and stored to the image capture device. Alternatively, or additionally, in some embodiments, the photo guide system may automatically capture the image upon determining that the field of view visible to the image capture device matches the composition defined by the first user.

In the method depicted in FIG. 1 and described above, a first user provides a desired composition, and the photo guide system guides a second user in capturing an image in whose composition matches the desired composition provided by the first user. While the first user/second user scenario represents a typical use case of the photo guide system, in some instances, the first user and the second user may be the same user. For example, a user may input a reference frame on his/her camera. The user may then move around such that the position and orientation of the camera is changed. The user may then want to recreate the desired composition and thus do a handoff to himself/herself. After the handoff, the guidance information provided by the photo guide system enables the user to reposition and reorient the camera such that field of view of the image capture device matches the desired composition. The user may then capture an image. Accordingly, use cases describing a first user and a second user are not meant to be limiting. In alternative embodiments, the functionality provided by the photo guide system can be used by a single user.

Figure 2:
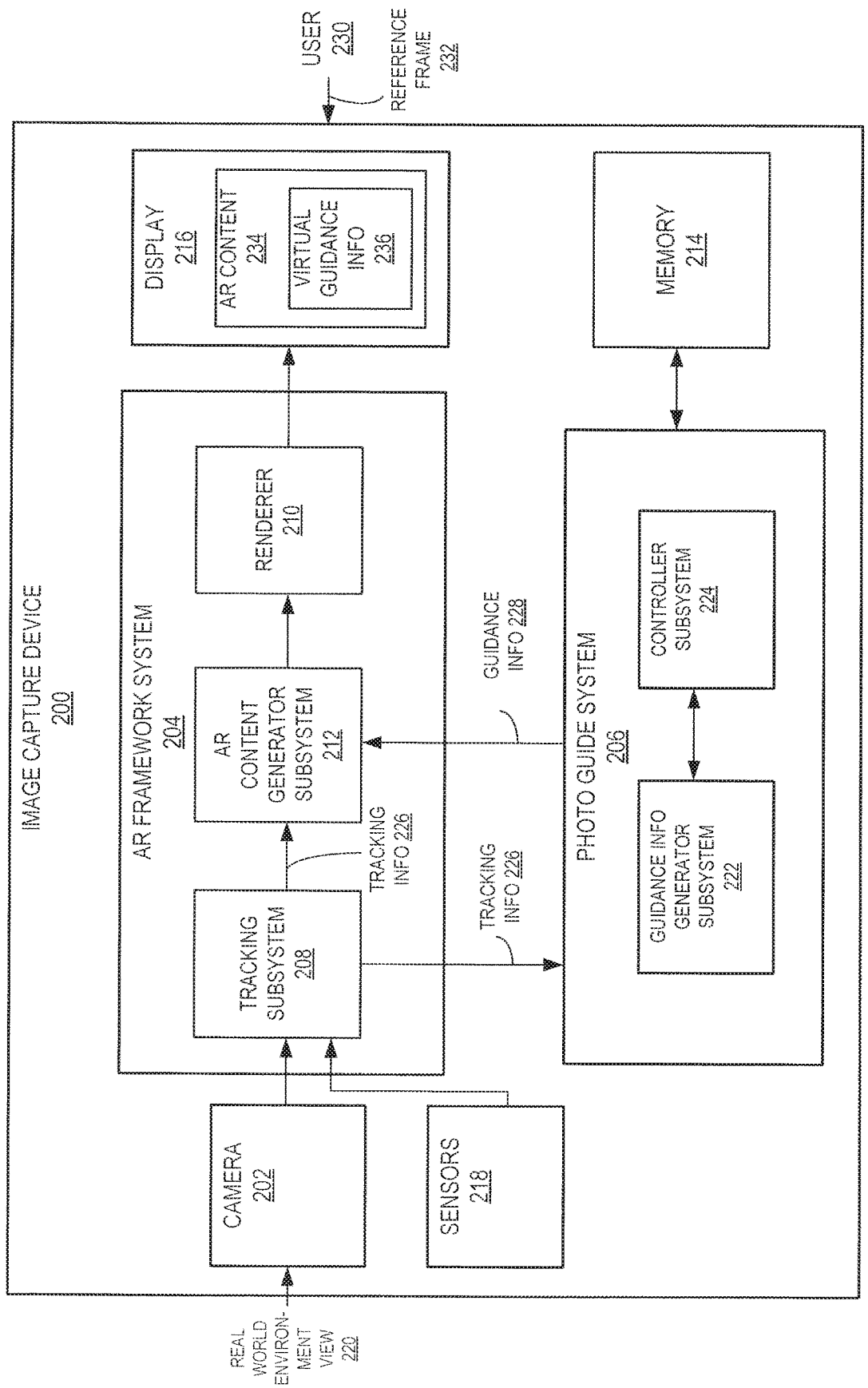
FIG. 2 depicts an example of an image capture device, according to certain embodiments of the present disclosure.

FIG. 2 depicts an example of an image capture device 200 including a photo guide system 206 for guiding image capture in cooperation with an AR framework system 204, according to certain embodiments. In the example depicted in FIG. 2, a camera 202 captures a real-world environment view 220 and sensors 218 capture positional information. The photo guide system 206, in conjunction with the AR framework system 204, executes operations for performing one or more functions used in guiding the capture of an image based on preconfigured parameters. Guidance information is conveyed to a user 230 via a display 216.

The camera 202 includes hardware and/or software configured to receive real-world environment view 220. The real-world environment view 220 corresponds to live images of a real environment corresponding to a field of view. These live images capture a view of the observable real-world environment corresponding to the field of view of the camera 202. The live images may correspond to one or more still images and/or live video.

In some embodiments, the camera 202 includes one or more elements for receiving the real-world environment view 220. Examples of such elements include a Charge-Coupled Device (CCD) and a Complementary Metal-Oxide-Semiconductor (CMOS) image sensor. The camera 202 is communicatively coupled to the AR framework system 204 and is configured to transmit the real-world environment view 220 to the AR framework system 204.

In some embodiments, the camera 202 further includes hardware and/or software configured to capture an image. The camera 202 may be configured to receive user input for capturing an image (e.g., by detecting user interaction with a shutter button). Alternatively, or additionally, the camera 202 may capture an image based on a signal received from the AR framework system 204 or the photo guide system 206 (e.g., responsive to detecting a triggering event, the photo guide system 206 may transmit an instruction to the camera 202 to capture an image).

The sensors 218 include hardware and/or software capable of capturing positional information associated with the image capture device 200. The image capture device 200 may include one or more types of sensors 218. Examples of types of sensors 218 include a gyroscope, a Global Positioning System (GPS) receiver, a Light Detection and Ranging (LIDAR) receiver, a sonar receiver, an accelerometer, a Passive InfraRed (PIR) sensor, and a camera (e.g., enabled with a filter to selectively receive infrared light).

The image capture device 200 includes functionality to receive input from a user 230. In some embodiments, user input may be received via the display 216 (e.g., via a touchscreen). Alternatively, or additionally, the image capture device may include one or more buttons, a keyboard, mouse, microphone with voice recognition software, and/or the like, for receiving user input.

In some embodiments, the user input received by the image capture device 200 characterizes a particular view of the real-world environment. This particular view may be defined via a reference frame 232. The reference frame 232 defines a real-world environment view based on a field of view of the image capture device at a particular moment. As an example, the user 230 interacts with an element on the display 216 (i.e., a shutter button) to send a signal to the image capture device 200 to set the reference frame 232. The image capture device 200 may further record other information gathered by the sensors 218 characterizing the image capture device 200 position at the time the reference frame 232 is established.

In some embodiments, the user input received by the image capture device 200 further includes supplemental parameters. The supplemental parameters include settings for capturing an image (e.g., flash settings, aspect ratio, ISO, white balance, exposure, filters, a number of images to be captured, etc.).

The AR framework system 204 includes hardware and/or software configured to generate an AR environment. In some embodiments, the AR framework system 204 includes a tracking subsystem 208, an AR content generator subsystem 212, and a renderer 210.

In some embodiments, the tracking subsystem 208 is configured to perform tracking during an AR session. During a session, tracking subsystem 208 is configured to maintain a correspondence between the real-world environment space that the image capture device 200 inhabits and a virtual space where virtual AR content is modeled and placed. The tracking subsystem 208 includes hardware and/or software configured to track and calculate a position and orientation of the image capture device 200 in real-world environment and maintain a correspondence in virtual space in which the virtual frame and virtual direction information are modeled. The tracking subsystem 208 receives, as input, real-world scene information from the camera 202. The tracking subsystem 208 also receives position and orientation information from one or more sensors 218 of image capture device 200. The tracking subsystem 208 tracks and calculates the pose of the image capture device 200 in real-time based upon information received from the camera 202 and/or sensors 218.

In some embodiments, the tracking subsystem 208 maps the environment based on the images and/or sensor data retrieved. For example, the tracking subsystem 208 extracts image features such as flat surfaces from a received first image. As a specific example, the tracking subsystem uses visual-inertial odometery to combine motion data and image data to recognize and track features in an image stream obtained by the image capture device 200. In some embodiments, the tracking subsystem uses Simultaneous Localization and Mapping (SLAM). SLAM involves incrementally constructing a map of the environment using key points and landmarks within a three-dimensional environment, and may use a combination of image data and other sensor data. The tracking subsystem 208 provides the tracking information to the photo guide system 206 and the AR content generator subsystem 212.

The photo guide system 206 includes hardware and/or software configured to guide the capture of an image with preconfigured parameters. In some embodiments, the photo guide system 206 generates guidance information 228 for guiding a user to capture an image via the guidance information generator subsystem 222 and controller subsystem 224.

In some embodiments, the controller subsystem 224 analyzes data characterizing the field of view of the image capture device 200 to establish guidance information 228. The data characterizing the field of view of the image capture device 200 may include tracking information 226 received from the AR framework system, a real-world environment view 220 received from the camera 202, and/or position and orientation information received from the sensors 218. The controller subsystem 224 may compare the field of view of the image capture device 200 to the reference frame 232. The controller subsystem determines directional information for guiding the field of view of the camera 202 towards alignment with the reference frame 232. The controller subsystem may transmit the directional information to the guidance information generator subsystem 222 to generate guidance information 228.

In some embodiments, the controller subsystem 224 generates interface elements for guiding users through image capture. For example, the controller subsystem may generate dialogues such as "Help me take a photo," "Get started," and "Take picture now!" The controller subsystem transmits instructions to the display 216 and/or AR framework system to cause display of the generated interface elements.

In some embodiments, the controller subsystem 224 initiates operations upon determining that the real-world environment view depicted by a live image captured by the image capture device at a given time matches the particular view defined by the user 230 (e.g., the particular view corresponding to the reference frame 232). Two views may be considered a match if the views are within a certain threshold of one another. As an example, the controller subsystem 224 may determine that the live image captured matches the particular view based on some percentage of similarity (e.g., 80%, 90%, 95%, or 99% similarity between the views). As another example, the controller subsystem 224 may determine that the live image captured matches the particular view based on a degree of overlap with the virtual frame and the reference frame (e.g., the virtual frame should be overlapping the reference frame or less than one millimeter apart).

Upon determining that the live image captured matches the particular view, the controller subsystem 224 may prepare modified guiding information (e.g., a notification, changing colors, flashing lights, etc.). Alternatively or additionally, the controller subsystem 224 may initiate automatic capture of an image upon determining that the live image captured matches the particular view. In some embodiments, the controller subsystem 224 coordinates with the camera 202 for capturing the image. For example, the controller subsystem 224 transmits instructions to the camera 202 to capture an image responsive to a triggering event (i.e., a determination that the live image captured matches the particular view). The controller subsystem 224 may store to memory 214 such an image acquired by the camera 202

In some embodiments, the guidance information generator subsystem 222 includes hardware and/or software for configuring guidance information 228. The guidance information 228 may include virtual guidance information indicative of the particular view defined by the user. The virtual guidance information may, for example, take the form of a virtual object or virtual frame corresponding to the reference frame.

The guidance information generator subsystem 222 may generate the virtual frame by incorporating tracking information 226 (e.g., X, Y, Z coordinates, solid angles, etc.) characterizing the user-defined reference frame 232. The guidance information generator subsystem 222 may define a visual representation of the virtual frame (e.g., as a box outlining a region corresponding to the reference frame 232.

In some embodiments, the guidance information generator subsystem 222 generates additional guidance information 228 based on information received from the controller subsystem 224. For example, if the controller subsystem 224 determines that the field of view is too far from the reference frame 232 in one direction, then the guidance information generator subsystem 222 generates virtual direction information directing a user to move and orient the image capture device 200 towards a point of alignment with the reference frame 232. The virtual direction information may include dots, arrows, voice commands, etc. The guidance information generator subsystem 222 transmits the guidance information 228 to the AR content generator subsystem 212.

In some embodiments, the AR content generator subsystem 212 includes hardware and/or software configured to augment a real-world scene with virtual guidance information 236. The AR content generator subsystem 212 generates AR content based upon information received from the tracking subsystem 208 and the photo guide system 206. The AR content generator subsystem 212 receives guidance information 228 from the photo guide system 206. The AR content generator subsystem 212 analyzes the tracking information 226 and guidance information 228 to determine an appropriate position for the guidance information 228 with respect to a live image captured by the camera 202.

In some embodiments, the renderer 210 includes hardware and/or software configured to render virtual guidance information 236. The virtual guidance information 236 may include a virtual frame and/or virtual direction information. The renderer 210 overlays the virtual guidance information 236 on a live camera image in a position and orientation determined by the AR content generator subsystem 212 to form AR content 234. The renderer 210 transmits the AR content 234 to the display 216 for output.

In some embodiments, the display 216 includes hardware and/or software configured to present information in a visual form. For example, the display 216 is configured to display Graphical User Interface ("GUI") elements, text, images, video, and/or other data. The display 216 may include, or be communicatively coupled with, elements for receiving user input (e.g., the display 216 may be a touchscreen display).

In one example, the camera 202 is coupled with the display 216 to display live preview images retrieved by the camera 202 on the display 216 so that a user of the image capture device 200 can view the image before saving it to the memory 214. This allows the display 216 to be used as a viewfinder of the camera 202. In addition to the live preview images, the display 216 is further utilized to display interface elements generated by the Photo guide system 206 for establishing parameters and/or capturing an image. The display 216 further presents the AR content 234 including virtual guidance information 236.

In some embodiments, the memory 214 includes one or more devices for storing electronic data. The memory 214 may be implemented using any combination of any number of non-volatile memories (e.g., flash memory) and volatile memories (e.g., DRAM, SRAM), or any other non-transitory storage medium, or a combination of media. In some embodiments, the memory 214 is configured to store data such as a captured image (e.g., a digital image such as a Joint Photographic Experts Group (JPEG) file, Portable Network Graphic (PNG) file, and/or the like). The captured image may be captured via the camera 202 as described above. In some embodiments, the memory 214 stores data associated with an image to be captured (e.g., a reference frame, a real-world environment view, supplemental parameters, and/or a virtual frame). In some embodiments, the memory 214 stores positional information characterizing the position, orientation, and/or field of view of the image capture device 200 over time.

Figure 3:
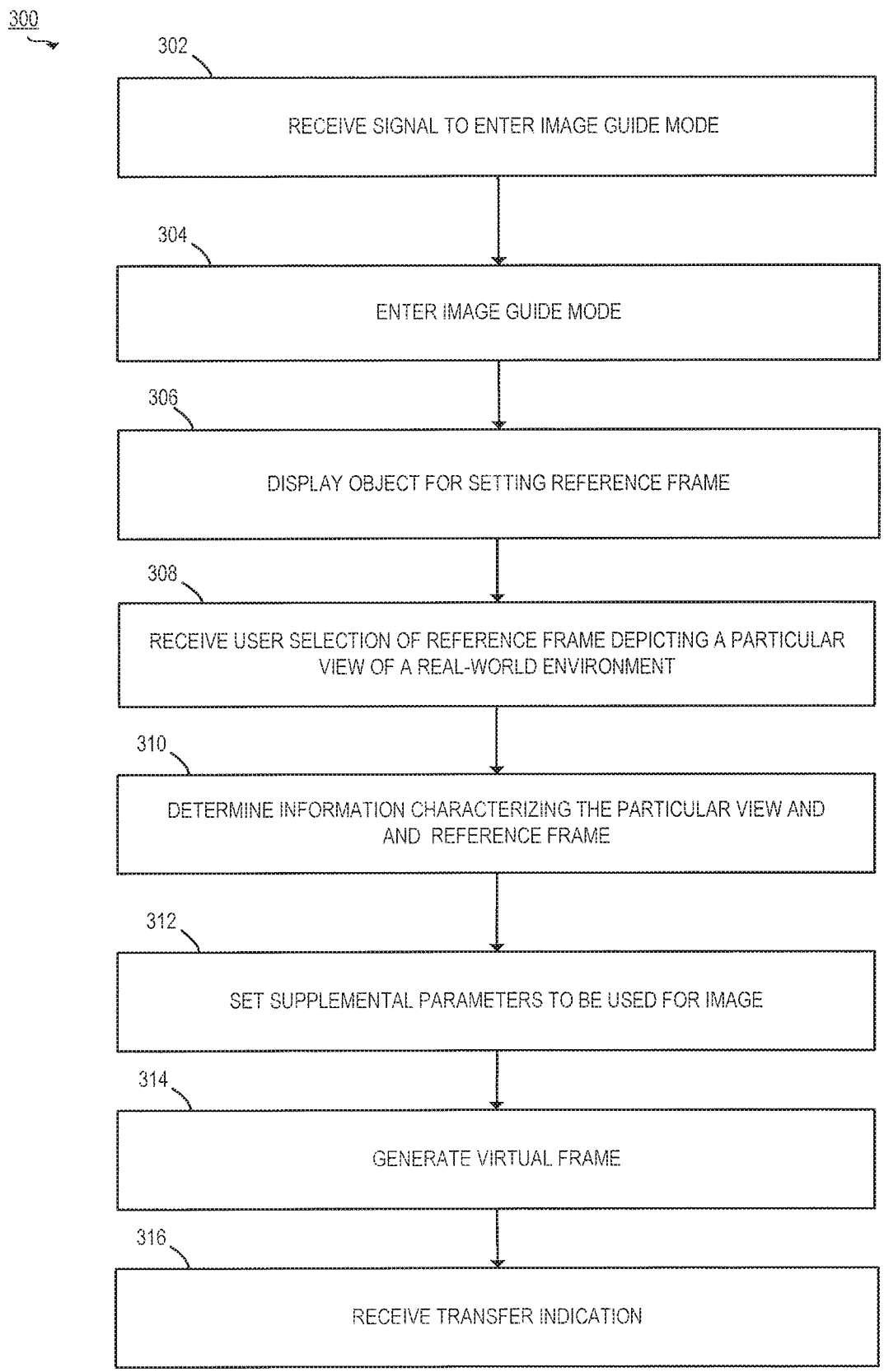
FIG. 3 depicts an example of a process for establishing image guiding parameters based on user input, according to certain embodiments of the present disclosure.

FIG. 3 depicts an example of a flow 300 for generating guidance information based on user input, according to certain embodiments. The operations described with respect to FIG. 3 may be executed by the components depicted in FIG. 2.

At 302, the photo guide system receives a signal to enter image guide mode. The signal may be generated via user input received from a first user that wishes to configure image guide parameters. As an example, the photo guide system causes display of a button (e.g., labeled "AR photo guide"). The button is displayed when the first user opens up a camera application on the image capture device. The first user interacts with the button. Based on detecting user interaction with the button, the photo guide system prepares to enter image guide mode.

At 304, the system enters image guide mode. In some embodiments, entering image guide mode comprises initiating an AR environment, which may be executed via the AR framework system. In some embodiments, the AR framework system initiates an AR session and initiates tracking the position and orientation of the image capture device. The AR framework system receives live image data corresponding to the surroundings. The AR framework system further receives motion data from an accelerometer, orientation data from a gyroscope, and/or the like. The AR framework system combines the live image data, motion data, and/or orientation data to recognize features and track the motion of the image capture device. The AR framework system compares information in the image feed with motion and/or orientation data to achieve a precise model of the position of the image capture device over time. The AR framework system may map the environment using visual-inertial odometry and/or SLAM. In some embodiments, the system begins tracking coordinates of the image capture device upon entering image guide mode. As an example, upon entering image guide mode, the system sets a three-dimensional coordinate position of the center of the field of view of the image capture device to (X=0, Y=0, Z=0). As the image capture device moves through space, the system continuously updates the center position of the image capture device (e.g., to (X=−30, Y=10, Z=90) and so forth).

At 306, the photo guide system displays an object for setting a reference frame. As an example, the photo guide system displays an icon and/or text indicating to a user that interaction with the interface will set a reference frame. As one specific example, as shown in FIG. 5A, the object for setting the reference frame includes a hand with a finger pointing to a button and the text "Tap to make a frame of your shot."

At 308, the photo guide system receives user selection of a reference frame depicting a particular view of a real-world environment. In some embodiments, reference frame is received due to interaction, by a user, with the object displayed at 306. Subsequently, the photo guide system detects a signal generated responsive to the interaction. The live image captured by the image capture device at the time the signal is detected may define the reference frame.

At 310, the photo guide system determines information characterizing the reference frame and particular view. In some embodiments, the photo guide system identifies information characterizing a field of view of the image capture device at the time that the signal indicating user selection of the reference frame was received. The photo guide system may gather and store the particular view captured by the image capture device at the time the signal was received. The photo guide system may identify objects within the field of view (e.g., horizontal surfaces). In some embodiments, the photo guide system stores the three-dimensional position of the image capture device defining the reference frame. The photo guide system may further identify solid angles corresponding to the view available to the image capture device. In some embodiments, the photo guide system generates a conical surface, with an origin at the center of the field of view of the image capture device. The conical surface may radiate out from the reference frame and be truncated at the reference frame so that the conical surface points toward the reference frame from one side.

At 312, the photo guide system sets supplemental parameters to be used for the image. In some embodiments, the photo guide system sets the supplemental parameters based on user input and/or default rules. For example, the photo guide system receives signals which were generated based on user input selecting parameters such as: whether to use a flash, a particular filter to use, ISO settings, exposure, depth of field, mode, focusing settings, white balance, and aperture. Alternatively, or additionally, the photo guide system identifies default settings (e.g., auto flash, no filter, etc.), which may occur in the absence of user selection of a particular available setting).

At 314, the photo guide system generates a virtual frame. In some embodiments, the photo guide system generates the virtual frame based on the reference frame. In some embodiments, the photo guide system cooperates with the AR framework system for rendering the virtual frame. The system may track the position of the image capture device relative to the reference frame at a given time, and render a virtual frame indicative of the reference frame which is modified as the image capture device moves through space.

At 316, the image capture device receives a transfer indication. In some embodiments, the image capture device displays, to a first user, an interface element for indicating intent to transfer the image capture device to a second user. The first user may interact with the interface element for indicating the intent to transfer. The image capture device detects a signal, based on user interaction with the interface element, indicating that the image capture device is to be transferred to another user. Alternatively, or additionally, the image capture device detects motion indicative of a transfer, and determines, based on the motion, that the image capture device has been transferred. As a specific example, the image capture device is enabled with a gyroscope which detects a particular pattern of motion indicative of transfer. Responsive to determining that the image capture device is to be transferred, the system may display modified virtual guidance information (e.g., second virtual guidance information for displaying to the second user which is different from first virtual guidance information displayed to the first user).

Figure 4:
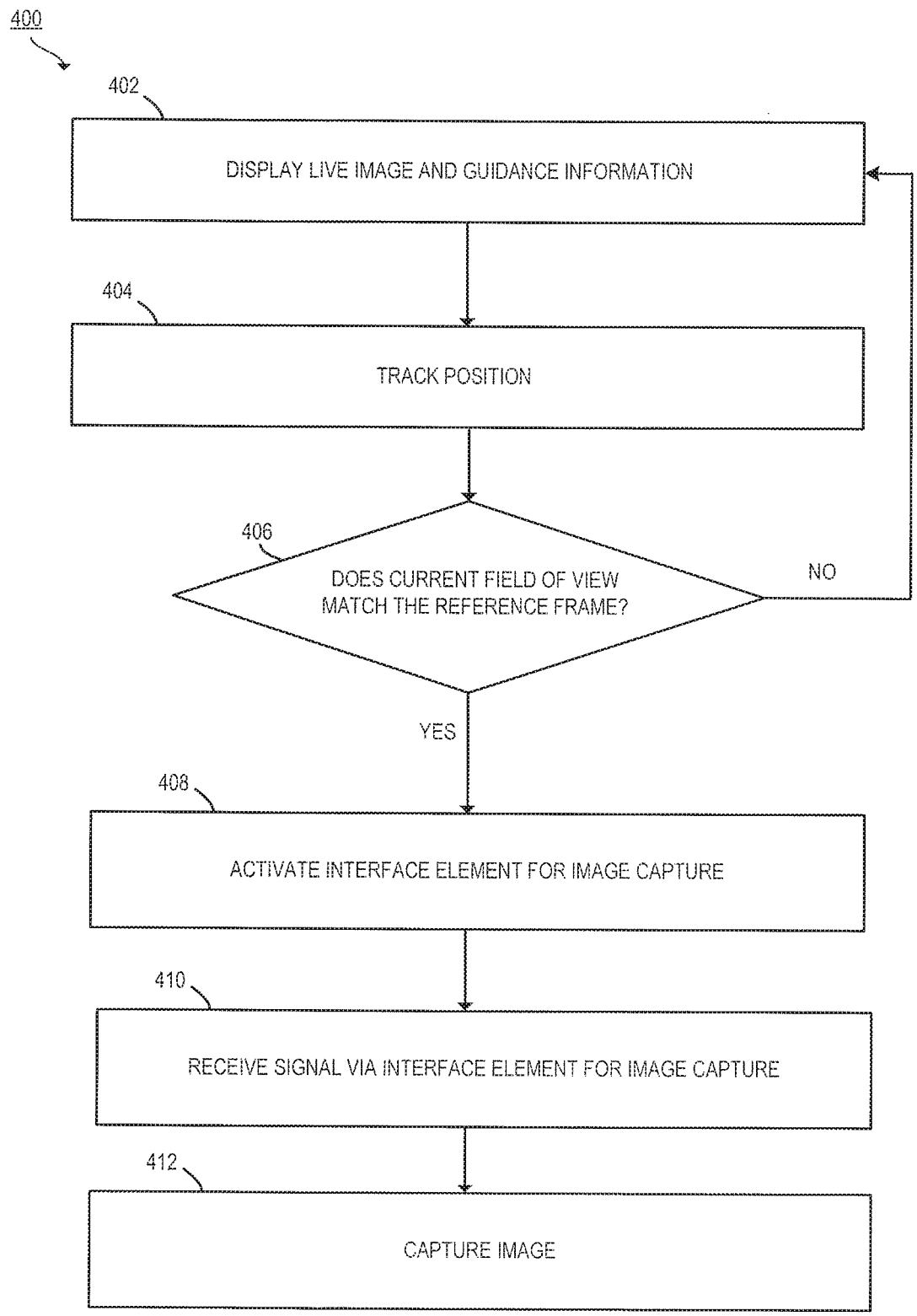
FIG. 4 depicts an example of guiding a user to capture an image with predefined parameters, according to certain embodiments of the present disclosure.

FIG. 4 depicts an example of a flow 400 for guiding image capture, according to certain embodiments. The operations described with respect to FIG. 4 may be executed by the components depicted in FIG. 2.

At 402, the image capture device displays a live image and guidance information. In some embodiments, the AR framework system generates an AR image by augmenting a received live image with guidance information such as virtual guidance information. The photo guide system generates guidance information. The guidance information may include virtual guidance information such as a virtual frame and/or virtual direction information. As an example, the guidance information may include virtual direction information such as dots, arrows, and/or the like indicating a direction in which the image capture device should be moved to achieve the desired composition. The image capture device may overlay the virtual direction information on the live image. The image capture device may further overlay a virtual object, such as the virtual frame generated at 314, described above, on the live image. The image capture device may overlay the virtual frame at a position based upon the particular view corresponding to the reference frame established at 308-310 and a view of the real-world environment depicted in a current live image. The image capture device may output the AR image (e.g., display the AR image to a user).

As another example, the photo guide system may provide guidance information by causing LEDs on the image capture device to blink rapidly when a user moves the image capture device such that the position and orientation of the image capture device approaches a position and orientation corresponding to the particular field of view defined. The LEDs may blink increasingly fast as the field of view of the image capture device approaches alignment with the particular field of view. As additional examples, the photo guide system may use voice commands and/or haptic feedback to guide a user to move the image capture device towards alignment with the particular field of view.

At 404, the AR framework system tracks a position of the image capture device. In some embodiments, the AR framework system receives data from one or more sensors on the image capture device, and/or external to the image capture device, for the tracking. As an example, the AR framework system receives image data from a camera on the image capture device. The updated live image data may correspond to a plurality of live images. As another example, the AR framework system receives orientation information from a gyroscope on the image capture device. As another example, the AR framework system receives motion information from an accelerometer on the image capture device. As another example, the AR framework system receives coordinate information from a GPS element on the image capture device. As another example, the AR framework system receives signals from one or more beacon transmitters external to the image capture device, which may be used to triangulate a location of the image capture device in relation to the beacon transmitters.

In some embodiments, the AR framework system uses the received data to track the position of the image capture device. The AR framework system may compute the position based on any combination of the data retrieved from the sensors. In some embodiments, the AR framework system continuously updates the position as the image capture device moves. The position may be computed, e.g., using SLAM and/or visual-inertial odometry. As an example, the AR framework system tracks the position of the center of a viewfinder over time based on (X, Y, Z) coordinates measured as an offset from an initial position of (0, 0, 0), tracks the solid angle at which the viewfinder is oriented over time using gyroscope data, and further fine-tunes the position of the image capture device by integrating acceleration data retrieved from an accelerometer. By computing the position based on a combination of data, the AR framework system achieves a very accurate position of the device so that the guided image can very closely correspond to the composition defined by the reference frame.

At 406, the photo guide system determines whether a current live image matches the particular view defined by the reference frame. In some embodiments, the photo guide system compares elements within the current live image with elements within the reference frame. The determination may involve comparison of planes and objects within the AR environment. For example, the photo guide system may determine whether both the reference frame and the current field of view each contain flat surfaces at substantially the same position. The determination may further involve comparison of position and orientation information. As an example, the photo guide system gathers orientation information determined based on gyroscope information and GPS coordinate information continually as the image capture device moves, and compares the gathered information to corresponding orientation and coordinate information stored with respect to the reference frame. In some embodiments, the photo guide system compares the position information and orientation of the image capture device to a conical surface emanating from the reference frame (e.g., as described above with respect to 310 of FIG. 3). Based on the position of the image capture device with respect to the conical surface, the photo guide system determines whether the image capture device is behind or in front of the frame, as well as proximity information.

In some embodiments, if the photo guide system determines that the view of the real-world environment depicted by a particular (e.g., first, second, or third) live image does not match the particular view defined by the reference frame ("No" at decision 406), then the photo guide system returns to 402. If the photo guide system determines that the particular live image does match the particular view defined by the reference frame ("Yes" at decision 406), then the photo guide system may proceed to 408.

At 408, the photo guide system activates an interface element for image capture. The photo guide system may activate the interface element for image capture responsive to determining that the particular live image matches the particular view defined by the reference frame. In some embodiments, the photo guide system activates a button, e.g., displayed overlaid upon the live image, for accepting user input for capturing an image. As another example, the photo guide system initiates monitoring for voice commands for capturing an image. As another example, the photo guide system initiates monitoring for a characteristic gesture (e.g., the second user may wave a hand in front of the image capture device to trigger image capture).

In some embodiments, the photo guide system provides modified guiding information based on determining that the current field of view matches, or almost matches, the field of view defined by the reference frame. As an example, the virtual frame begins to flash (e.g., between black and white) when the alignment between the field of view of the image capture device and the reference frame crosses a proximity threshold. As another example, the interface element for capturing the image changes color (e.g., from white to blue). As another example, the portion of the field of view displayed, which is outside of the reference frame, starts with some degree of opacity or blur and this opacity or blur decreases as the field of view becomes more closely aligned with the reference frame. As other examples, the photo guide system may flash a light, display text, or output a sound (e.g., a beep, or a voice saying "alignment achieved"), upon determining that the current field of view matches, or almost matches, the field of view defined by the reference frame.

At 410, the image capture device receives a signal via the interface element for image capture. The image capture device may receive a signal which was generated based on user input indicating selection of the interface element for image capture, e.g., via a touchscreen display on the image capture device. Alternatively, or additionally, the image capture device receives signals for image capture based on input such as detecting the second user has waved a hand in front of the image capture device or detecting that the second user has issued a verbal cue for image capture.

At 412, the image capture device captures an image. The image capture device captures the image by receiving and storing image data, e.g., via one or more CCDs. The image capture device the image responsive to detecting the signal received (e.g., via the interface element for image capture).

Alternatively, or additionally, the photo guide system may cause the camera to capture the image automatically upon detecting that the particular live image matches the particular view defined by the reference frame. In this case, 408-410 may be omitted. In some embodiments, the photo guide system uses detection methods (e.g., face detection) to help determine an appropriate position triggering image capture.

The photo guide system may apply the supplemental parameters before, during, or after the time that the image capture device captures the image. As an example, the photo guide system applies an exposure setting prior to capturing the image, based on a supplemental parameter regarding an exposure setting. As another example, the photo guide system activates a flash substantially simultaneously to capturing the image, based on a supplemental parameter regarding a flash setting. As another example, the photo guide system applies a filter, corresponding to a supplemental parameter, after capturing the image.

FIGS. 5A-5B depict example user interfaces for establishing image guiding parameters 500A and 500B, according to certain embodiments. FIG. 5A shows a user interface comprising elements for establishing a reference frame for a guided image. FIG. 5B shows a user interface comprising elements for indicating intent to transfer an image capture device. The interfaces of FIGS. 5A and 5B may be displayed to a first user, for configuring parameters to pass on to a second user. Interfaces as described below with respect to FIGS. 6A-6F may be displayed to the second user.

In FIG. 5A, a first user interface for establishing image guiding parameters 500A is shown. The first user interface for establishing image guiding parameters 500A includes a live image 501 corresponding to a particular view of a real-world environment. The first user interface for establishing image guiding parameters 500A further includes interface elements configured to receive user input selecting a reference frame. In this embodiment, the interface elements include the text "Tap to make a frame of your shot," 502, and an icon representing a hand pushing a button 504.

In FIG. 5B, a second user interface for establishing image guiding parameters 500B is shown. The second user interface for establishing image guiding parameters 500B includes a live image 501 corresponding to a particular view of a real-world environment. The second user interface for establishing image guiding parameters 500B further includes interface elements configured for receiving user input indicating intent to transfer an image capture device. In this embodiment, the interface element includes a user-selectable button including an arrow icon 506. The second user interface for establishing image guiding parameters 500B further includes a virtual frame 508, which was generated based on the reference frame captured via the first user interface for establishing image guiding parameters 500A.

Figure 6D:
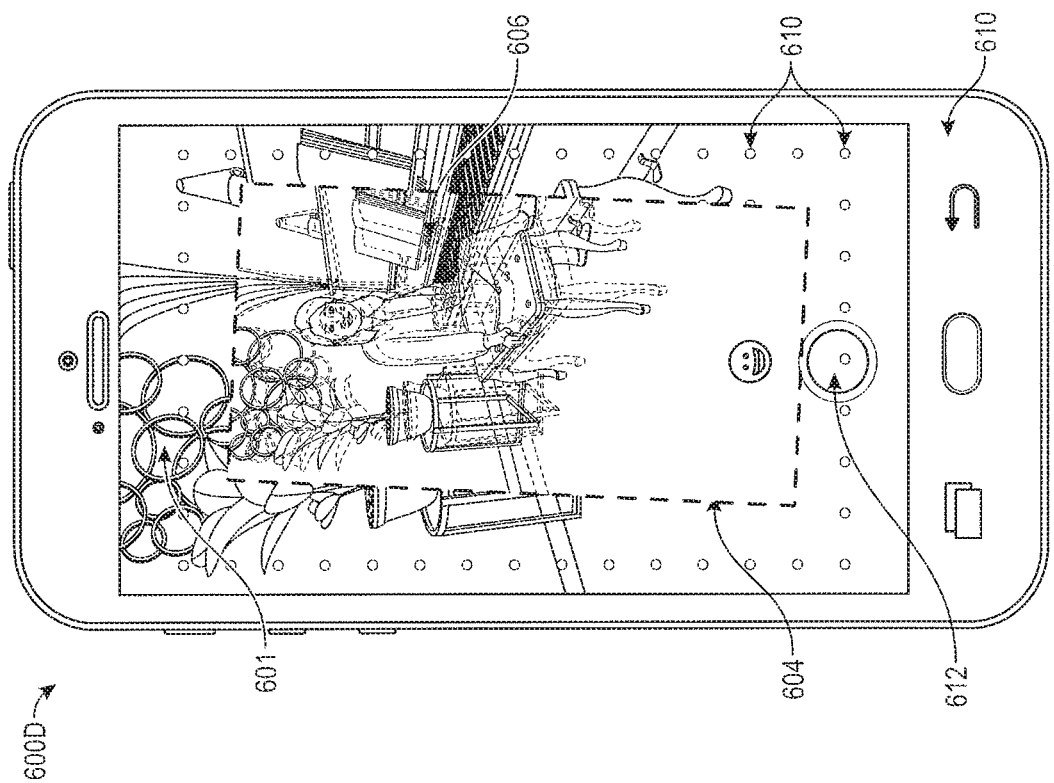
Figure 6C:
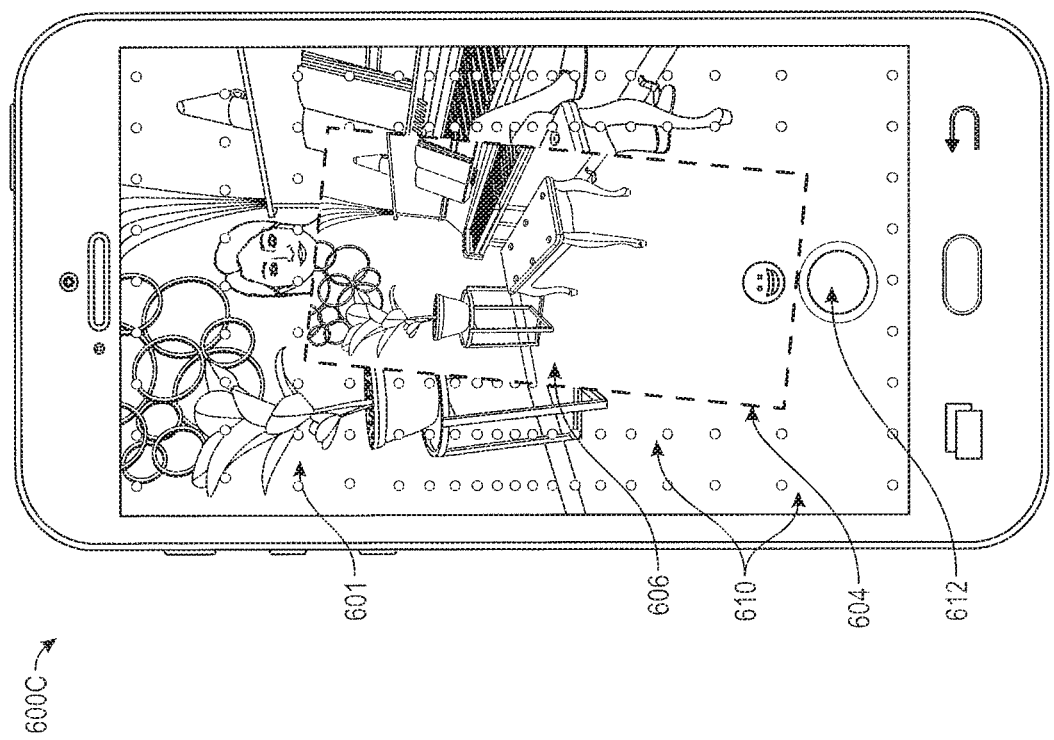
Figure 6F:
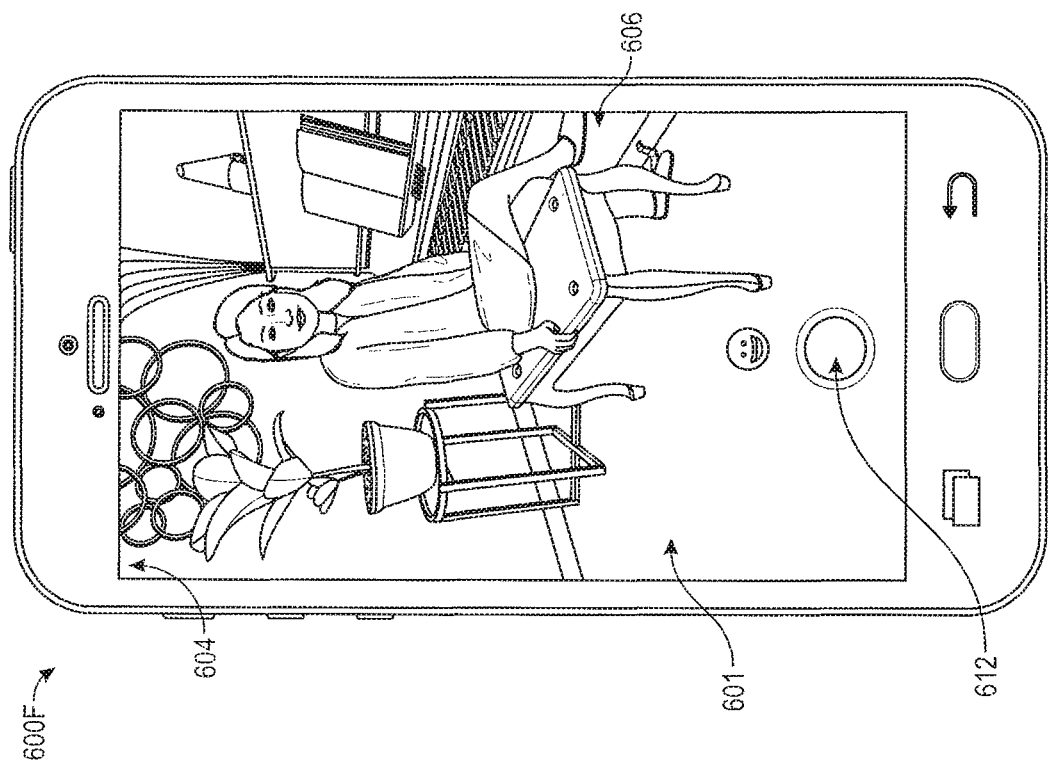

FIGS. 6A-6F depict example user interfaces for initiating guided image capture 600A-600F, according to certain embodiments. FIGS. 6A and 6B show user interfaces comprising elements for initiating guiding a user to change the position and orientation of an image capture device to a position and orientation that depicts a particular view. FIGS. 6C-6F show user interfaces comprising elements for guiding a user to change the position and orientation of an image capture device to a position and orientation that depicts a particular view (e.g., upon initiation). The interfaces shown in FIGS. 6A-6F may be displayed to a second user, after a first user established image guiding parameters using interfaces as illustrated in FIGS. 5A-5B.

In FIG. 6A, a first user interface for initiating guided image capture 600A is shown. The first user interface for initiating guided image capture 600A includes a live image 601. The first user interface for initiating guided image capture 600A further includes interface elements configured to initiate guiding the user to change the position and orientation of an image capture device to a position and orientation that depicts a particular view. The interface elements are overlaid upon the live image 601. The first user interface for initiating guided image capture 600A darkens the live image 601, to draw the user's attention towards the position and orientation that depicts the particular view.

In this embodiment, the interface elements include the text "Help me take a photo! Here's how I want it to look." 602. The interface elements further include a virtual frame 604 showing the position and orientation that depicts the particular view. The interface elements further include an overlay 606 showing a predefined composition corresponding to the particular view (e.g., as defined by a first user via the interface elements illustrated in FIG. 5A). Although the virtual frame 604 is displayed, the user may not have the image capture device positioned so that the entire virtual frame 604 is shown. The image capture device may further be oriented at an incorrect angle with respect to the virtual frame 604. As seen in FIG. 6A, the virtual frame 604 is oriented at an angle and partially cut off. Accordingly, it is useful to show the desired composition in full and upright using the overlay 606. Virtual direction information 610, in the form of dots radiating out from the virtual frame, is further displayed in the first user interface for initiating guided image capture 600A.

The interface elements further include a user-selectable button 608 labeled "Get Started." Upon detecting user interaction with the button 608, the system initiates guiding the user to align the user device in accordance with the virtual frame 604 and transitions to display interface elements as shown in FIGS. 6C-6F.

In FIG. 6B, a second user interface for initiating guided image capture 600B is shown. The second user interface for initiating guided image capture 600B is substantially similar to the a first user interface for initiating guided image capture 600A, described above, but illustrates how the interface appears when image capture device is in a different position with respect to the desired composition. In FIG. 6B, as compared with FIG. 6A, more of the composition within the virtual frame 604 has been cut off, and more guiding information 610 is visible. As the user moves the image capture device further from a point of alignment with the predefined composition, more dots are shown radiating from the virtual frame to emphasize the direction the user should move the image capture device.

In FIG. 6C, a first user interface for guiding alignment 600C is shown. The first user interface for guiding alignment 600C includes a live image 601. The first user interface for guiding alignment 600C further includes interface elements configured to guide the user to align the user device with the reference frame, which are overlaid upon the live image 601. The interface elements include a virtual frame 604, overlay 606, and virtual direction information 610, which are substantially similar as described above with respect to FIG. 6A. In FIG. 6C, additional virtual direction information, e.g., more dots, is shown due to the adjusted field of view of the image capture device.

The first user interface for guiding alignment 600C further includes a shutter button 612. The shutter button 612 becomes visible based on detecting user interaction with a "Get Started" button, as shown in FIGS. 6A and 6B. The shutter button 612 is configured to accept user input for capturing an image and to transmit a signal for capturing an image to appropriate hardware and/or software elements on the image capture device.

In FIG. 6D, a second user interface for guiding alignment 600D is shown. The second user interface for guiding alignment 600D includes elements which are substantially similar to those described above with respect to the first user interface for guiding alignment 600C. However, the field of view of the image capture device has been modified as the user moved the image capture device. As compared with FIG. 6C, in FIG. 6D, the field of view of the image capture device is closer to a position of alignment with the virtual frame 604. Accordingly, less guiding information 610 is shown in FIG. 6D than in FIG. 6C. Further, the opacity of the overlay 606 is reduced as compared to FIG. 6C.

Figure 6E:
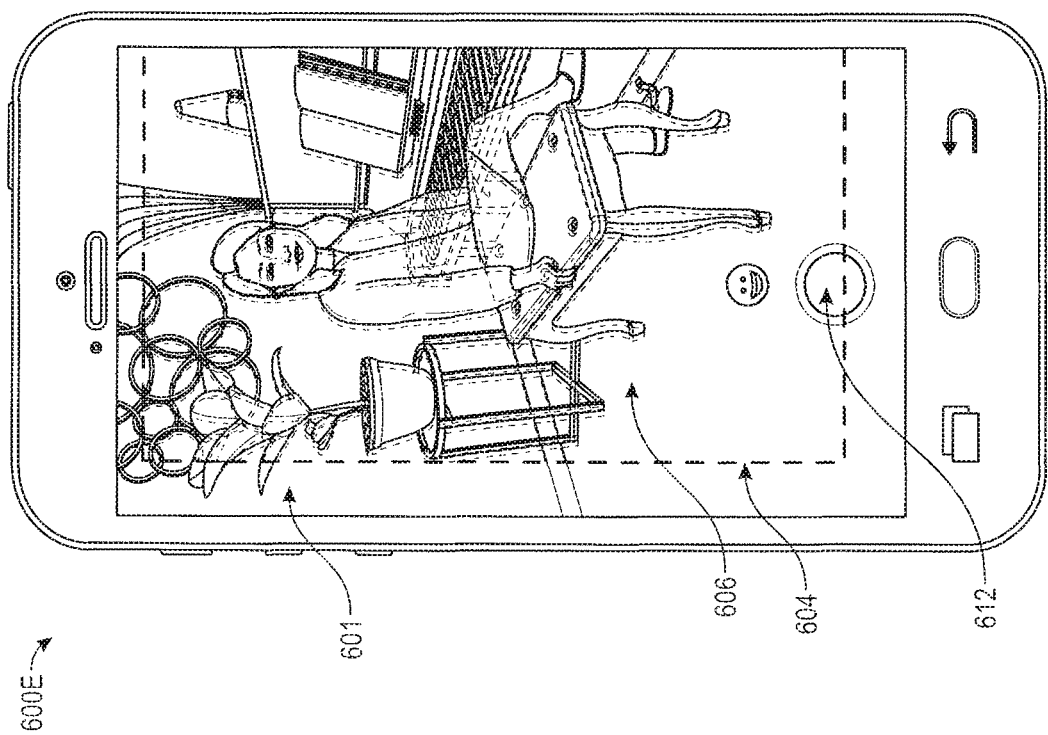

In FIG. 6E, a third user interface for guiding alignment 600E is shown. The third user interface for guiding alignment 600E includes elements which are substantially similar to those described above with respect to user interfaces for guiding alignment 600C and 600D. However, the field of view of the image capture device has been modified as the user moved the image capture device. As compared with FIGS. 6C and 6D, in FIG. 6E, the field of view of the image capture device is closer to a position of alignment with the virtual frame 604. In FIG. 6E, the field of view of the image capture device is so near to alignment with the virtual frame 604, that the guiding information 610 is no longer shown in FIG. 6E. Further, the opacity of the overlay 606 is greatly reduced in FIG. 6E, in comparison to the opacity of the overlay 606 in FIGS. 6C and 6D.

In FIG. 6F, a fourth user interface for guiding alignment 600F is shown. The fourth user interface for guiding alignment 600F includes elements which are substantially similar to those described above with respect to the user interfaces for guiding alignment 600C-600E. However, the field of view of the image capture device has been modified as the user moved the image capture device. As compared with FIGS. 6C-6E, in FIG. 6F, the field of view of the image capture device is closer to a position of alignment with the virtual frame 604. In FIG. 6F, the field of view of the image capture device is so near to alignment with the virtual frame 604, that the virtual frame 604 is barely visible at the edges of the interface. Further, the opacity of the overlay 606 is so low in FIG. 6F that the overlay 606 is barely discernible. These modifications, as the field of view of the image capture device changes, help to guide the user to change the position and orientation of an image capture device to a position and orientation that depicts a particular view, for capturing an image that depicts the particular view.

Figure 7:
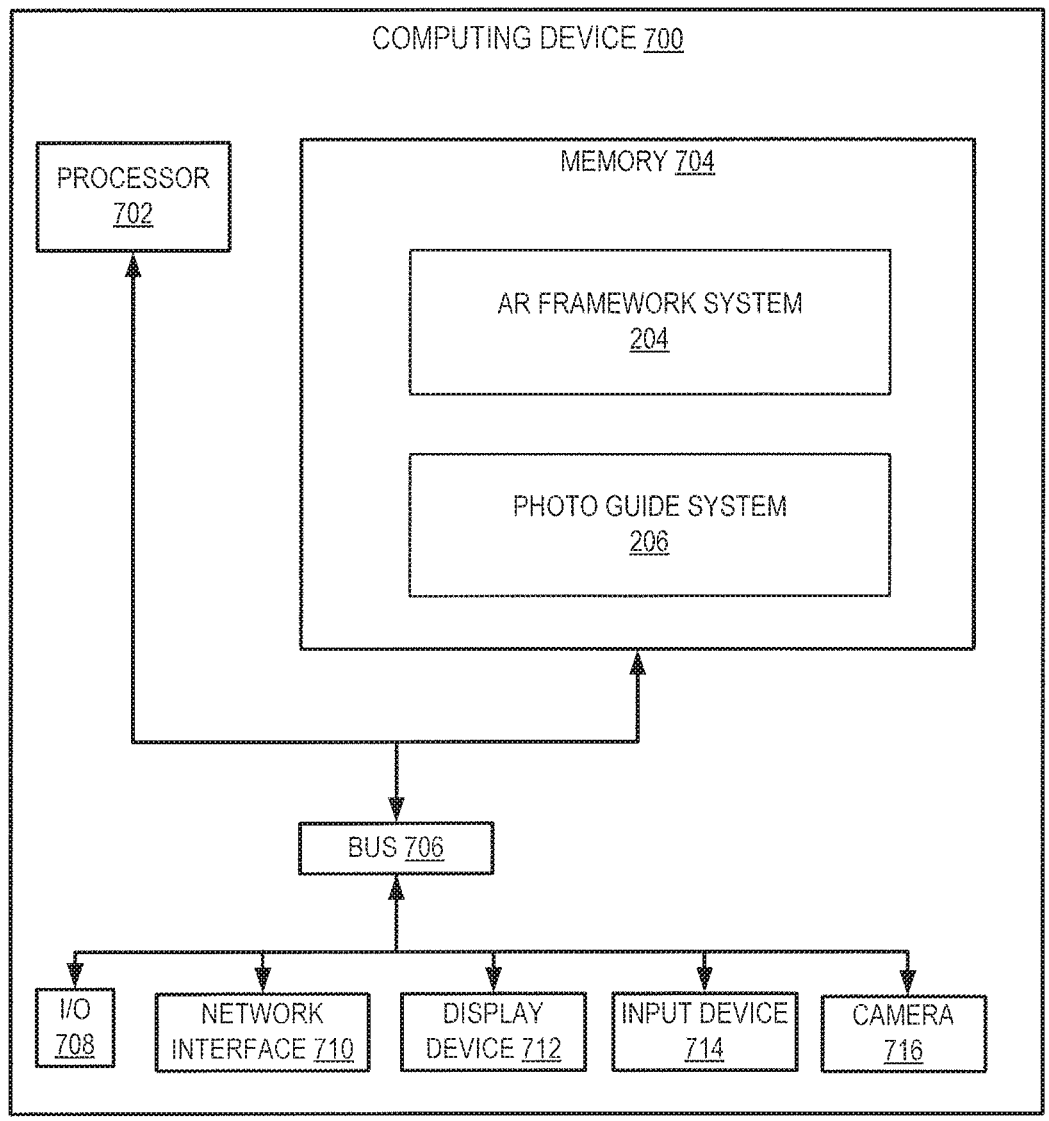
FIG. 7 depicts an example of a computing system that performs certain operations described herein, according to certain embodiments of the present disclosure.

Any suitable computing system or group of computing systems can be used for performing the operations described herein. For example, FIG. 7 depicts examples of a computing device 700 that executes an AR framework system 204 and a photo guide system 206 (as described above with respect to FIG. 2).

The depicted examples of a computing device 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing device 700 may also include a number of external or internal devices, such as input or output devices. For example, the Computing device 700 is shown with one or more input/output ("I/O") interfaces 708. An I/O interface 708 can receive input from input devices or provide output to output devices. One or more buses 706 are also included in the computing device 700. The bus 706 communicatively couples one or more components of a respective one of the computing device 700.

The computing device 700 executes program code that configures the processor 702 to perform one or more of the operations described herein. The program code may correspond to the AR framework system 204 and the photo guide system 206 and/or other suitable applications that perform one or more operations described herein. The program code may be resident in the memory device 704 or any suitable computer-readable medium and may be executed by the processor 702 or any other suitable processor. In some embodiments, the AR framework system 204 and photo guide system 206 are stored in the memory device 704, as depicted in FIG. 7. In additional or alternative embodiments, one or more of the AR framework system 204 and photo guide system 206 are stored in different memory devices of different computing systems. In additional or alternative embodiments, the program code described above is stored in one or more other memory devices accessible via a data network.

In some embodiments, one or more of these data sets, models, and functions are stored in the same memory device (e.g., the memory device 704). For example, a device, such as the image capture device 200 depicted in FIG. 2, can host the AR framework system 204 and photo guide system 206. In additional or alternative embodiments, one or more of the programs, data sets, models, and functions described herein are stored in one or more other memory devices accessible via a data network.

The computing device 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing device 700 is able to communicate with one or more other computing devices via a data network using the network interface device 710.

Figure 8:
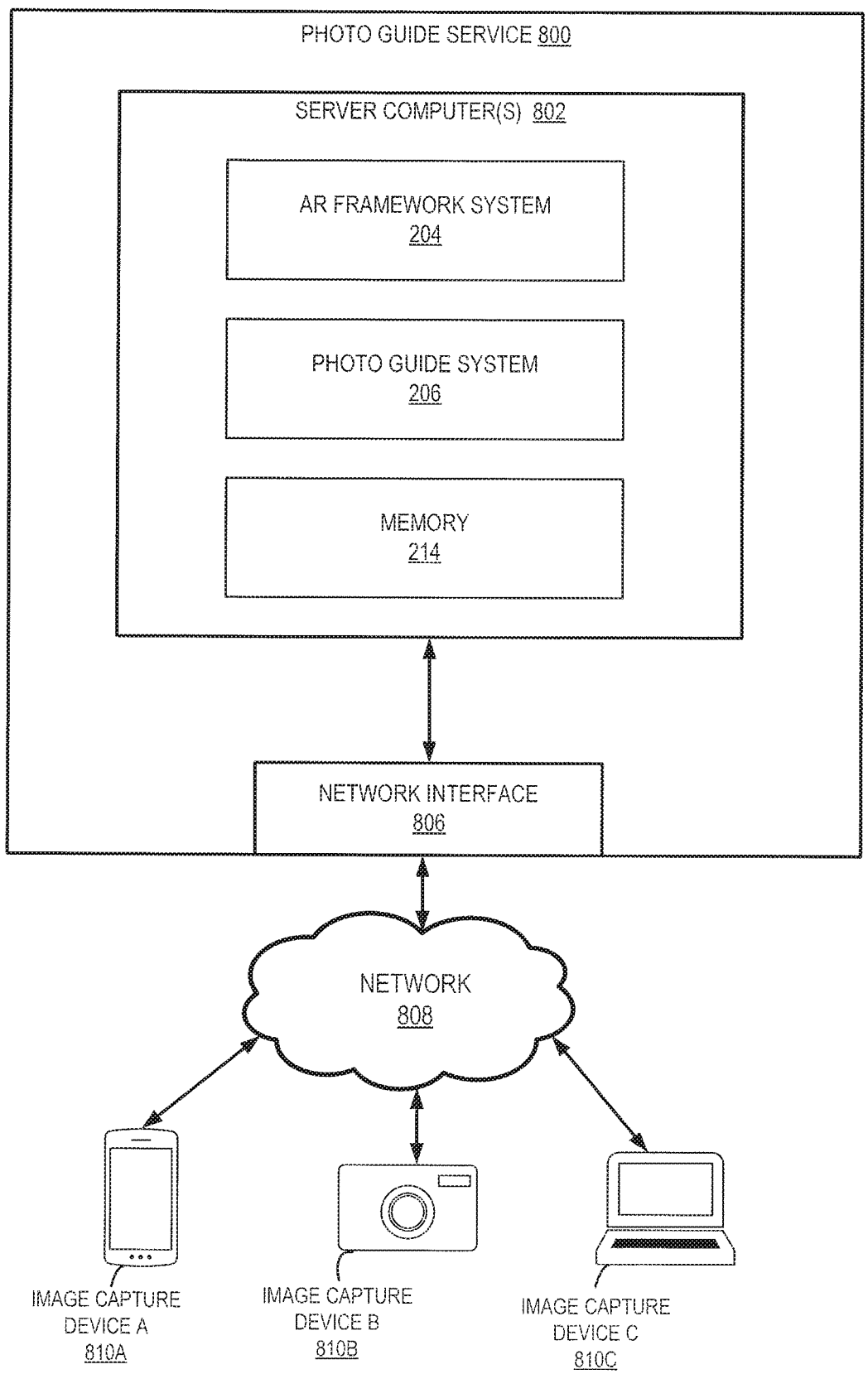
FIG. 8 depicts another example of a computing system that performs certain operations described herein, according to certain embodiments of the present disclosure.

In some embodiments, the functionality provided by the computing device 700 may be offered as a cloud-based photo guide service 800 by a cloud service provider. For example, FIG. 8 depicts an example of a cloud-based photo guide service 800 offering one or more photo guiding services that can be used by a number of user subscribers using image capture devices 810A, 810B, and 810C across a network 808. In certain embodiments, the photo guiding services provided by the photo guide service 800 include a service that generates guiding information based on input parameters (e.g., composition and supplemental parameters) supplied by the image capture devices 810A, 810B, and 810C. In some cases, the photo guiding services may be offered under a Software as a Service (SaaS) model. One or more users may subscribe to the photo guiding services, and the photo guide service 800 performs the processing to provide the image guiding services to subscribers. The photo guide service 800 may include one or more remote server computer(s) 802.

The remote server computer(s) 802 include any suitable non-transitory computer-readable medium for storing program code (e.g., code for the AR framework system 204 and photo guide system 206), memory 214, or both, which is used by the photo guide service 800 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 802 can include volatile memory, non-volatile memory, or a combination thereof.

One or more of the server computer(s) 802 execute the program code (e.g., via the AR framework system 204 and photo guide system 206) that configures one or more processors of the server computer(s) 802 to perform one or more of the operations that provide photo guiding services, such as generating guiding information and capturing a guided image. Any other suitable systems or subsystems that perform one or more operations described herein (e.g., a subsystem for generating tracking information) can also be implemented by the photo guide service 800.

In certain embodiments, the photo guide service 800 may implement the services by executing program code and/or using program data, which may be resident in a memory device of the server computer(s) 802 or any suitable computer-readable medium and may be executed by the processors of the server computer(s) 802 or any other suitable processor. In certain embodiments, the memory 214 includes any of the data described above with respect to FIG. 2. The data may be stored on the same memory device or distributed across different memory devices accessible via the network 808.

The photo guide service 800 also includes a network interface device 806 that enables communications to and from the photo guide service 800. In certain embodiments, the network interface device 806 includes any device or group of devices suitable for establishing a wired or wireless data connection to the network 808. Non-limiting examples of the network interface device 806 include an Ethernet network adapter, a modem, and/or the like. The photo guide service 800 is able to communicate with the image capture devices 810A, 810B, and 810C via the network 808 using the network interface device 806.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method comprising:
   generating a virtual frame corresponding to a reference frame, the reference frame depicting a particular view of a real-world environment captured by an image capture device defining a desired composition;
   receiving a live image captured using the image capture device, the live image depicting a corresponding view of the real-world environment based upon a position and orientation of the image capture device at a time of capturing the live image;
   generating a first augmented reality (AR) image by augmenting the live image with first virtual guidance information, the first virtual guidance information comprising the virtual frame and virtual direction information, the virtual direction information comprising a plurality of visual indicators radiating from the virtual frame as guidance for changing the position and orientation of the image capture device at the time of capturing the live image to match a position and orientation of the image capture device that depicts the particular view, the plurality of visual indicators increasing as the virtual frame is less aligned with the particular view and the plurality of visual indicators decreasing as the virtual frame is more aligned with the particular view, wherein generating the first AR image comprises overlaying the virtual frame on the live image at a position determined based upon the particular view and the corresponding view of the real-world environment depicted in the live image; and
   outputting the first AR image via the image capture device.

2. The method of claim 1, wherein the live image is a first live image and the virtual direction information is first virtual direction information, the method further comprising:
   generating a second augmented reality (AR) image by augmenting a second live image with second virtual guidance information, the second virtual guidance information comprising the virtual frame and second virtual direction information, wherein a view of the real-world environment corresponding to the second live image is different from the view of the real-world environment corresponding to the first live image, wherein the second virtual direction information is different from the first virtual direction information, and wherein generating the second AR image comprises:
   overlaying the virtual frame on the second live image at a position determined based upon the particular view and the view of the real-world environment depicted in the second live image, and
   overlaying the second virtual direction information on the second live image, the second virtual direction information comprising information for changing a position and orientation of the image capture device from a position and orientation at a time of capturing the second live image to a position and orientation of the image capture device that depicts the particular view; and
   outputting the second AR image via the image capture device.

3. The method of claim 1, wherein the virtual direction information further comprises one or more of:
   arrows indicating the position and orientation of the image capture device that depicts the particular view;
   haptic feedback indicative of the position and orientation of the image capture device that depicts the particular view; or
   voice commands indicative of the position and orientation of the image capture device that depicts the particular view.

4. The method of claim 1, further comprising:
   determining, based upon a third live image, that a view of the real-world environment depicted by the third live image matches the particular view; and
   responsive to determining that based on the determining that the view of the real-world environment depicted by the third live image matches the particular view, activating an interface element on the image capture device for enabling capturing an image using the image capture device.

5. The method of claim 4, further comprising:
   detecting input indicating selection of the interface element for capturing the image; and
   responsive to the detecting, capturing an image using the image capture device.

6. The method of claim 5, further comprising:
   receiving the reference frame based on interaction with the image capture device by a first user; wherein
   the input indicating selection of the interface element for capturing the image is provided by a second user different from the first user.

7. The method of claim 1, further comprising:
   determining, based upon a third live image, that a view of the real-world environment depicted by the third live image matches the particular view; and responsive to determining that the view of the real-world environment depicted by the third live image matches the particular view, automatically capturing a guided image.

8. The method of claim 1, further comprising determining whether a view of the real-world environment depicted by the live image matches the particular view by performing one or more of:
   determining a three-dimensional coordinate position of the image capture device;
   detecting a Global Positioning System (GPS) position of the image capture device;
   using a gyroscope to determine an orientation of the image capture device; or
   detecting a location of the image capture device in relation to one or more beacon transmitters.

9. The method of claim 1, further comprising:
   identifying supplemental parameters configured by a first user for the image capture device, the supplemental parameters comprising one or more of a flash setting, an International Standard Organization (ISO) setting, a number of images to be captured, an aperture setting, a shutter speed setting, a white balance setting, a focusing setting, or a mode setting; and
   based on determining that the view of the real-world environment depicted by a third live image matches the particular view, capturing by a second user a guided image based on the supplemental parameters.

10. The method of claim 1, further comprising:
    displaying, to a first user, an interface element for indicating intent to transfer the image capture device to a second user;
    detecting user interaction with the interface element for indicating the intent to transfer; and
    responsive to the detecting, displaying second virtual guidance information different from the first virtual guidance information.

11. An image capture device comprising a processor and a non-transitory computer-readable medium coupled to the processor, the non-transitory computer-readable medium comprising code executable by the processor to perform a method comprising:
    receiving a reference frame depicting a particular view of a real-world environment captured by the image capture device defining a desired composition;
    receiving a live image captured using the image capture device, the live image depicting a corresponding view of the real-world environment based upon a position and orientation of the image capture device at a time of capturing the live image;
    generating a first augmented reality (AR) image by augmenting the live image with first virtual guidance information, the first virtual guidance information comprising first virtual direction information, the first virtual direction information comprising a plurality of visual indicators radiating from a virtual frame as guidance for changing the position and orientation of the image capture device at the time of capturing the live image to match a position and orientation of the image capture device that depicts the particular view, the plurality of visual indicators increasing as the virtual frame is less aligned with the particular view and the plurality of visual indicators decreasing as the virtual frame is more aligned with the particular view, wherein generating the first AR image comprises overlaying the first virtual direction information on the live image; and
    outputting the first AR image via the image capture device.

12. The image capture device of claim 11, the method further comprising:
    receiving an updated live image;
    based on the updated live image, determining updated guiding information; and
    providing an indication of the updated guiding information.

13. The image capture device of claim 11, the method further comprising:
    generating the virtual frame corresponding to the reference frame; and
    overlaying the virtual frame on the first live image at a position determined based upon the particular view and a view of the real-world environment depicted in the first live image.

14. The image capture device of claim 13, wherein the live image is a first live image, the method further comprising:
    generating a second augmented reality (AR) image by augmenting a second live image with second virtual guidance information, the second virtual guidance information comprising the virtual frame and second virtual direction information, wherein a view of the real-world environment corresponding to the second live image is different from the view of the real-world environment corresponding to the first live image, wherein the second virtual direction information is different from the first virtual direction information, and wherein generating the second AR image comprises:
    overlaying the virtual frame on the second live image at a position determined based upon the particular view and the view of the real-world environment depicted in the second live image, and
    overlaying the second virtual direction information on the second live image, the second virtual direction information comprising information for changing a position and orientation of the image capture device from a position and orientation at a time of capturing the second live image to a position and orientation of the image capture device that depicts the particular view; and
    outputting the second AR image via the image capture device.

15. The image capture device of claim 11, the method further comprising:
    determining, based upon a third live image, that a view of the real-world environment depicted by the third live image matches the particular view; and
    based on the determining that the view of the real-world environment depicted by the third live image matches the particular view, activating an interface element on the image capture device for enabling capturing an image using the image capture device.

16. The image capture device of claim 15, the method further comprising:
    detecting input indicating selection of the interface element for capturing the image; and
    responsive to the detecting, capturing an image using the image capture device.

17. The image capture device of claim 16, wherein:
    the reference frame is received due to interaction with the image capture device by a first user; and the input indicating selection of the interface element for capturing the image is provided by a second user different from the first user.

18. The image capture device of claim 11, the method further comprising:
   determining, based upon a third live image, that a view of the real-world environment depicted by the third live image matches the particular view; and
   based on the determining that the view of the real-world environment depicted by the third live image matches the particular view, automatically capturing a guided image.

19. A non-transitory computer-readable medium having instructions stored thereon, the instructions executable by a processing device to perform operations comprising:
   generating a virtual frame corresponding to a reference frame, the reference frame depicting a particular view of a real-world environment captured by an image capture device defining a desired composition;
   receiving a live image captured using the image capture device, the live image depicting a view of the real-world environment based upon a position and orientation of the image capture device at a time of capturing the live image;
   generating an augmented reality (AR) image by augmenting the live image with virtual guidance information, the virtual guidance information comprising the virtual frame and virtual direction information, the virtual direction information comprising a plurality of visual indicators radiating from the virtual frame as guidance for changing the position and orientation of the image capture device at the time of capturing the live image to match a position and orientation of the image capture device that depicts the particular view, the plurality of visual indicators increasing as the virtual frame is less aligned with the particular view and the plurality of visual indicators decreasing as the virtual frame is more aligned with the particular view, wherein generating the AR image comprises:
      overlaying the virtual frame on the live image at a position determined based upon the particular view and the view of the real-world environment depicted in the live image, and
      overlaying the virtual direction information on the live image; and
   outputting the AR image via the image capture device.

* * * * *